(12) United States Patent
Dong et al.

(10) Patent No.: US 11,337,248 B2
(45) Date of Patent: May 17, 2022

(54) FULL-DUPLEX TRANSMISSION METHOD AND RELATED DEVICE

(71) Applicant: HUAWEI TECHNOLOGIES CO., LTD., Guangdong (CN)

(72) Inventors: Chen Dong, Beijing (CN); Tong Jiang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 3 days.

(21) Appl. No.: 16/918,486

(22) Filed: Jul. 1, 2020

(65) Prior Publication Data

US 2020/0337085 A1    Oct. 22, 2020

Related U.S. Application Data

(63) Continuation of application No. PCT/CN2018/071319, filed on Jan. 4, 2018.

(51) Int. Cl.
*H04W 74/08* (2009.01)
*H04L 5/00* (2006.01)
*H04L 5/14* (2006.01)

(52) U.S. Cl.
CPC ....... *H04W 74/0808* (2013.01); *H04L 5/0055* (2013.01); *H04L 5/14* (2013.01)

(58) Field of Classification Search
CPC ..... H04W 74/0808; H04L 5/0055; H04L 5/14
USPC ............................... 370/329, 310.2; 455/515
See application file for complete search history.

(56) References Cited

U.S. PATENT DOCUMENTS

| 5,390,181 | A  |   | 2/1995  | Campbell et al. |
|-----------|----|---|---------|-----------------|
| 6,408,009 | B1 |   | 6/2002  | Campbell et al. |
| 10,420,115| B2 | * | 9/2019  | Na .......... H04B 17/24 |
| 2016/0112824 | A1 |   | 4/2016  | Tuset Peir et al. |
| 2016/0344535 | A1 | * | 11/2016 | Kakani ...... H04L 5/16 |

(Continued)

FOREIGN PATENT DOCUMENTS

CN   101399833 A   4/2009
CN   103200132 A   7/2013

(Continued)

OTHER PUBLICATIONS

Laya et al., "Goodbye, Aloha!," Special Section on the Plethora of Research in Internet of Things (IOT), IEEE, Apr. 21, 2016, 16 pages.

(Continued)

*Primary Examiner* — Danh G Le
(74) *Attorney, Agent, or Firm* — Fish & Richardson P.C.

(57) ABSTRACT

Methods, devices, and systems for full-duplex transmission are provided. In one aspect, a method can include: sending, by a first node, access request information to a second node in a first access timeslot, receiving, by the first node, full-duplex feedback information sent by the second node, receiving, by the first node, a target identifier sent by the second node, the full-duplex feedback information indicating that the first access timeslot is in a successful state, and determining, by the first node, a target queue location of the first node associated with a conflict resolution queue in response to at least one of: determining that the target identifier is different from an identifier of the first node, or determining that the full-duplex feedback information indicates that the first access timeslot is in an idle state.

18 Claims, 14 Drawing Sheets

(56) References Cited

U.S. PATENT DOCUMENTS

| | | | | |
|---|---|---|---|---|
| 2017/0064721 A1* | 3/2017 | Noh | .................... | H04W 72/048 |
| 2018/0084506 A1* | 3/2018 | Min | .................... | H04B 17/345 |
| 2018/0192431 A1* | 7/2018 | Wang | ................ | H04W 28/0278 |
| 2018/0337809 A1* | 11/2018 | Kishiyama | ............ | H04W 28/06 |
| 2020/0029112 A1* | 1/2020 | Xu | .................... | H04N 21/2396 |
| 2020/0052830 A1* | 2/2020 | Liu | ........................ | H04L 1/1896 |
| 2020/0195383 A1* | 6/2020 | Liu | ........................ | H04L 1/1671 |
| 2020/0274686 A1* | 8/2020 | Khude | .................. | H04L 5/0007 |
| 2020/0403759 A1* | 12/2020 | Abdelghaffar | ........ | H04L 5/0094 |

FOREIGN PATENT DOCUMENTS

| | | | |
|---|---|---|---|
| CN | 106937399 A | | 7/2017 |
| KR | 20070060797 A | | 6/2007 |
| WO | 2014191052 A1 | | 12/2014 |
| WO | 2018176431 A1 | | 10/2018 |

OTHER PUBLICATIONS

PCT International Search Report and Written Opinion issued in International Application No. PCT/CN2018/071319 dated Sep. 11, 2018, 15 pages (with English translation).

Office Action issued in Chinese Application No. 201880081911.8 dated Aug. 17, 2021, 17 pages (with English translation).

Office Action issued in Chinese Application No. 201880081911.8 dated Mar. 25, 2022, 9 pages.

\* cited by examiner

FULL-DUPLEX TRANSMISSION METHOD AND RELATED DEVICE

CROSS-REFERENCE TO RELATED APPLICATIONS

This application is a continuation of International Patent Application No. PCT/CN2018/071319 filed on Jan. 4, 2018, the disclosure of which is hereby incorporated by reference in its entirety.

TECHNICAL FIELD

This application relates to the field of communications technologies, and in particular, to a full-duplex transmission method and a related device.

BACKGROUND

In a communications system, full-duplex transmission means that a node can receive data while sending data. FIG. 1 is a schematic diagram of a topology structure of full-duplex transmission. As shown in FIG. 1, if a node A receives data sent by a node C while sending data to a node B, the node A implements full-duplex transmission.

Establishment of full-duplex transmission includes establishment of first transmission and establishment of second transmission. A specific process is determining two (or three) nodes participating in full-duplex transmission and allocating transmission resources to the nodes to perform full-duplex transmission. A line of thought of establishing full-duplex transmission is: Two nodes first obtain transmission resources required by the two nodes, to start transmission, namely, the first transmission. Two nodes participating in the second transmission and a time point at which the second transmission starts need to be determined according to a specific method and rule.

In the prior art, as shown in FIG. 2, downlink transmission between a second node and a third node is first transmission and is non-contention-based transmission, and uplink transmission between a first node and the second node is second transmission and is contention-based transmission. Each time the second node sends a downlink physical frame to the third node, an uplink channel from the first node to the second node correspondingly has a transmission window in this time period. Each transmission window includes one access channel and one transmission channel, and the access channel further includes access timeslots with equal duration. The first node randomly selects any one of the access timeslots to send access request information to the second node, and the first node sends an uplink physical frame to the second node over a transmission channel in a non-contention-based manner. The first node can join a data transmission queue to queue up for an opportunity of sending the uplink physical frame to the second node over the transmission channel in the non-contention-based manner, only after the access request information sent by the first node in the access timeslot is successfully received by the second node. If a plurality of other first nodes also send access request information to the second node in the access timeslot selected by the first node, the second node fails to receive the access request information because of a conflict. All the first nodes sending the access request information in the access timeslot need to join a conflict resolution queue to queue up for an opportunity of retransmitting the access request information. After transmission of the downlink physical frame sent by the second node ends, when the second node receives an ACK frame sent by the third node, the second node broadcasts an ACK frame to the first node. The ACK frame sent by the second node carries full-duplex feedback information, and the full-duplex feedback information indicates statuses of the access timeslots on the access channel. A status of the access timeslot includes three states: a successful state, a conflicted state, and an idle state. The first node needs to determine whether the first node needs to join the conflict resolution queue for queuing up (when the access timeslot in which the first node sends the access request information is in the conflicted state) or join the data transmission queue for queuing up (when the access timeslot in which the first node sends the access request information is in the successful state), based on the statuses of the access timeslots indicated by the full-duplex feedback information.

The foregoing full-duplex transmission method can be reliably implemented on the premise that the second node and the first node have a same opinion about a status of an access timeslot. To be specific, when the second node indicates that the access timeslot is in the successful state, the first node also considers that the access timeslot is indeed in the successful state. However, in an actual case, affected by a difference between conditions of channels between different first nodes and the second node, interference that occurs on a channel, or the like, the second node and the first node may have different opinions about a status of a same access timeslot. When the second node and the first node have different opinions about the status of the same access timeslot, or when the first node does not receive the full-duplex feedback information sent by the second node, the first node enters an indefinite state. To be specific, the first node is uncertain about whether the first node needs to join the conflict resolution queue for queuing up or join the data transmission queue for queuing up, or does not know a specific queue location of the first node. When this case occurs, the foregoing full-duplex transmission method cannot be normally implemented.

SUMMARY

Embodiments of the present invention provide a full-duplex transmission method and a related device that can ensure correct running of a node and reduce a contention-based access delay of the node.

A first aspect of the embodiments of the present invention provides a full-duplex transmission method.

The method described in this aspect includes step A, step B, step C, and step D.

The steps are specifically performed as follows.

Step A: A first node sends access request information to a second node in a first access timeslot, where the first access timeslot is any access timeslot that is selected by the first node from a plurality of access timeslots included in a transmission window (TW), and the access request information is a request that is sent by the first node before the first node sends a second physical frame to the second node.

It should be noted that in this embodiment of the present invention, there may be a plurality of first nodes, and each first node randomly selects one of the access timeslots to send the access request information to the second node. Therefore, there may also be a plurality of first access timeslots.

Step B: The first node receives full-duplex feedback information sent by the second node, where the full-duplex feedback information indicates statuses of the access timeslots in the transmission window (TW). A possible status of each access timeslot includes: a successful state, that is, the second node successfully receives, in the access timeslot, the access request information sent by the first node: a conflicted state, that is, the second node detects an effective physical frame preamble in the access timeslot but fails in parsing out a correct physical frame header; and an idle state, that is, the second node does not receive, in the access timeslot, the access request information sent by any first node.

Step C: The first node further receives a target identifier sent by the second node, when the full-duplex feedback information indicates that the first access timeslot is in a successful state.

It should be noted that, when the full-duplex feedback information indicates that the first access timeslot is in another state (such as a conflicted state or an idle state), the first node does not need to receive the target identifier sent by the second node.

There may be a plurality of first nodes, and there may also be a plurality of first access timeslots. Therefore, if the full-duplex feedback information indicates that a plurality of first access timeslots are indicated as being in a successful state, the second node needs to send a plurality of target identifiers, and a plurality of first nodes need to receive the target identifiers. Each target identifier correspondingly indicates one first access timeslot. At least one first node sends access request information to the second node in each first access timeslot, and the second node successfully receives at least one piece of access request information. A target identifier corresponding to the first access timeslot indicates a node ID of a node sending the access request information that is successfully received by the second node in the first access timeslot.

Step D: When the first node determines that the target identifier is different from an identifier of the first node, or when the full-duplex feedback information indicates that the first access timeslot is in an idle state, the first node determines a target queue location of the first node in a conflict resolution queue.

It should be noted that, when the first node determines that the target identifier is different from the identifier of the first node, it indicates that the first access timeslot has been indicated as being in a successful state by the full-duplex feedback information, and that the first node has received, in step C, the target identifier sent by the second node. After comparing the received target identifier with the identifier of the first node, the first node determines that access request information successfully received by the second node in the first access timeslot is not the access request information sent by the first node itself but rather another first node. Therefore, the first node determines that the first node needs to join the CRQ for queuing up, and then needs to determine a specific queue location of the first node in the CRQ according to the method in this embodiment of the present invention.

When the full-duplex feedback information indicates that the first access timeslot is in an idle state, it indicates that the first node sends the access request information in the first access timeslot. However, the second node indicates, in the full-duplex feedback information, that the first access timeslot is in an idle state. This indicates that the second node does not detect the access request information sent by the first node. Therefore, the first node needs to join the CRQ for queuing up, and then needs to determine a specific queue location of the first node in the CRQ according to the method in this embodiment of the present invention.

It can be learned that the first node described in this aspect determines that there are two cases for the target queue location. One case is: When the full-duplex feedback information indicates that the first access timeslot is in a successful state, and the target identifier is different from the identifier of the first node, the first node can determine that the second node successfully receives access request information in the first access timeslot indeed, but the access request information is not sent by the first node itself but rather another first node. A cause for the phenomenon is: Both the first node and a first node indicated by the target identifier send access request information in the first access timeslot. Physical signals of the two pieces of access request information overlap on a receiver of the second node, a receive signal-to-noise ratio of a physical signal of the access request information sent by the first node is lower, and a receive signal-to-noise ratio of a physical signal of the access request information sent by the first node indicated by the target identifier is higher. In this case, the second node can successfully receive the access request information sent by the first node indicated by the target identifier, and the second node considers the access request information sent by the first node as noise and processes the access request information. In this way, the second node indicates, in the full-duplex feedback information, that the first access timeslot is in a successful state. The other case is: The second node indicates, in the full-duplex feedback information, that the first access timeslot is in an idle state. In this case, the first node can determine that the access request information sent by the first node in the first access timeslot is unsuccessfully received by the second node, for the reason that a communication link between the first node and the second node may be shielded, interference may occur in the link, or the like, resulting in a quite low receive signal-to-noise ratio, on the second node, of a physical signal of the access request information sent by the first node. Therefore, the second node cannot detect any signal, and then determines that the first access timeslot is in an idle state.

Regardless of either of the two cases, the first node can determine that the first node needs to join the conflict resolution queue CRQ for queuing up, to resend the access request information to the second node. According to the prior art, once an access timeslot is indicated as being in a successful state, a first node sending access request information in the access timeslot joins, by default, a DTQ for queuing up, but not joins a CRQ for queuing up. In this case, when indicating a CRQ length in full-duplex feedback information, the second node does not consider the first node sending the access request information in the first access timeslot, because the second node considers that the first node sending the access request information in the first access timeslot has joined the DTQ for queuing up, and that the first node does not need to retransmit the access request information and does not need to occupy a queue location in the CRQ either. Likewise, according to the prior art, once an access timeslot is indicated as being in an idle state, the second node considers that no first node sends access request information in the access timeslot. In this case, when indicating a CRQ length in full-duplex feedback information, the second node does not consider the first node sending the access request information in the first access timeslot either. In the two cases, the first node and the second node have different opinions about a CRQ queuing status, that is, the CRQ length considered by the second node is less than a CRQ length considered by the first node. A specific CRQ length depends on a quantity of first access timeslots. In addition, the second node does not reserve a specific queue location for the first node in the CRQ. Beneficial effects of this embodiment of the present invention are as follows. One effect is: The second node sends the target identifier, so that the first node can compare the target identifier with the identifier of the first node to determine that such an error occurs in the first access timeslot. This avoids queuing time wasted because the first node mistakenly considers that the first node has joined the DTQ for queuing up. The other effect is: After the first node determines that the first node needs to join the CRQ for queuing up, the specific queue location of the first node in the CRQ is determined in this embodiment of the present invention, so that the first node can still queue up in the CRQ after determining that the foregoing two cases occur. This avoids an uncertain processing action caused by an indefinite queue location of the first node in the CRQ, and effectively ensures normal running of full-duplex transmission.

According to the first aspect of the embodiments of the present invention, in a first implementation of the first aspect of the embodiments of the present invention, step D specifically includes: if the full-duplex feedback information indicates that there is only one second access timeslot in a conflicted state, determining, by the first node, that the target queue location is a queue location of the second access timeslot in the conflict resolution queue.

According to the first aspect of the embodiments of the present invention, in a second implementation of the first aspect of the embodiments of the present invention, step D specifically includes: if the full-duplex feedback information indicates that there are a plurality of second access timeslots in a conflicted state, determining, by the first node, that the target queue location is a queue location, in the conflict resolution queue, of a second access timeslot in the plurality of second access timeslots that is closest to the first access timeslot.

According to the first aspect of the embodiments of the present invention, in a third implementation of the first aspect of the embodiments of the present invention, step D specifically includes: if the full-duplex feedback information indicates that there are a plurality of second access timeslots in a conflicted state, and two second access timeslots in the plurality of second access timeslots are closest to the first access timeslot, determining, by the first node, that the target queue location is a queue location, in the conflict resolution queue, of a second access timeslot in a higher rank in the two second access timeslots that are closest to the first access timeslot.

According to the first aspect of the embodiments of the present invention, in a fourth implementation of the first aspect of the embodiments of the present invention, step D specifically includes: if the full-duplex feedback information indicates that the access timeslots included in the TW do not include a timeslot in a conflicted state, that is, if the full-duplex feedback information indicates that all access timeslots are in a successful state or an idle state, when the conflict resolution queue is not empty, determining, by the first node, that the target queue location is a queue end location in the conflict resolution queue.

According to the first aspect of the embodiments of the present invention, in a fifth implementation of the first aspect of the embodiments of the present invention, step D specifically includes the following steps.

Step D11: The first node sends a NACK signal in a negative acknowledgment NACK timeslot, where the negative acknowledgment NACK timeslot appears after the first node receives the full-duplex feedback information.

Step D12: The first node receives queue adjustment indication information sent by the second node, where the queue adjustment indication information is used to indicate the target queue location, and the target queue location is any location in the conflict resolution queue or a location following a queue end location in the conflict resolution queue.

There are two manners of sending the queue adjustment indication information by the second node to the first node:

One manner is: The second node described in this embodiment detects whether there is the NACK signal in the NACK timeslot: and if the second node detects that there is the NACK signal, the second node sends the queue adjustment indication information to the first node. Specifically, the second node adds the queue adjustment indication information to a first physical frame that is sent by the second node in a next transmission window. The queue adjustment indication information is used to indicate the target queue location, and the target queue location is any location in the CRQ. A specific location of the target queue location in the CRQ is not limited in this embodiment. For example, the target queue location may be the queue end location in the CRQ. The first physical frame in the next transmission window references a first physical frame in a current transmission window. The current transmission window is the transmission window in which the first access timeslot used by the first node to send the access request information is located.

The other manner is: The second node in this embodiment may add the queue adjustment indication information to a first physical frame, in each transmission window, sent by the second node to the first node. In this case, the queue adjustment indication information needs to indicate whether the CRQ length is adjusted. The queue adjustment indication information sent by the second node can indicate that the CRQ length is adjusted, and the queue adjustment indication information indicates the target queue location, only when the second node detects that there is the NACK signal.

Step D13: The first node determines the target queue location based on the queue adjustment indication information.

According to the first aspect of the embodiments of the present invention, in a sixth implementation of the first aspect of the embodiments of the present invention, step D specifically includes: if the full-duplex feedback information indicates that there are a plurality of second access timeslots in a conflicted state, determining, by the first node, that the target queue location is a queue location, in the conflict resolution queue, of any one of the plurality of second access timeslots.

According to the first aspect of the embodiments of the present invention, in a seventh implementation of the first aspect of the embodiments of the present invention, step D specifically includes: if the full-duplex feedback information indicates that all access timeslots are in a successful state or an idle state, when the conflict resolution queue is not empty, determining, by the first node, that the target queue location is any location in the conflict resolution queue.

According to the first aspect of the embodiments of the present invention, in an eighth implementation of the first aspect of the embodiments of the present invention, step C of further receiving, by the first node, a target identifier sent by the second node, when the full-duplex feedback information indicates that the first access timeslot is in a successful state specifically includes: receiving, by the first node, a physical frame sent by the second node, where the target identifier is carried in the physical frame, and the physical frame is sent by the second node after the second node has sent the full-duplex feedback information.

It should be noted that in this embodiment, the physical frame is a first physical frame sent by the second node to a third node, and the first physical frame is sent by the second node to the third node in the next transmission window A destination receiving node of a payload carried in the first physical frame is the third node, a destination receiving node of full-duplex indication information carried in a frame header of the first physical frame is the first node, and the target identifier is also carried in the frame header of the first physical frame. The two information portions, namely, the payload and the frame header of the first physical frame, need to be received by the third node and the first node, respectively. However, because both the third node and the first node are within a coverage area of the second node, after the second node sends the first physical frame, the third node receives the first physical frame and parses the first physical frame to obtain payload information required by the third node, and the first node may parse the first physical frame to obtain the full-duplex indication information and the target identifier.

The next transmission window references the current transmission window. The current transmission window is the transmission window in which the first access timeslot used by the first node to send the access request information to the second node is located, and the next transmission window is a transmission window that appears following the current transmission window.

Alternatively, in another embodiment, step C of further receiving, by the first node, a target identifier sent by the second node, when the full-duplex feedback information indicates that the first access timeslot is in a successful state specifically includes: receiving, by the first node, the full-duplex feedback information, where the target identifier is carried in the full-duplex feedback information.

It should be noted that in this embodiment, step B of receiving, by the first node, full-duplex feedback information and step C of receiving, by the first node, the full-duplex feedback information are same actions. The first node does not need to receive the full-duplex feedback information once again for receiving the target identifier, but the first node can obtain the target identifier directly from the received full-duplex feedback information after step B is performed. This is because the target identifier is carried in the full-duplex feedback information, or in other words, the target identifier and the full-duplex feedback information are sent together by carrying them in a same physical frame (a fourth physical frame).

According to any one of the first aspect of the embodiments of the present invention to the eighth implementation of the first aspect of the embodiments of the present invention, in a ninth implementation of the first aspect of the embodiments of the present invention, the method further includes:

Step E: If the first node determines that the target identifier is the same as the identifier of the first node, the first node joins a data transmission queue for queuing up.

A second aspect of the embodiments of the present invention provides a full-duplex transmission method, including:

step A: a second node receives, in a first access timeslot, access request information sent by a first node;

step B: the second node sends full-duplex feedback information to the first node; and step C: the second node sends a target identifier to the first node when the full-duplex feedback information indicates that the first access timeslot is in a successful state.

It can be learned that in the method described in this aspect, when the full-duplex feedback information indicates that the first access timeslot is in a successful state, the second node needs to send the target identifier to the first node, where the target identifier is an identifier of the first node that sends, in the first access timeslot, the access request information successfully received by the second node. When finding that the first access timeslot in which the first node sends the access request information is indicated as being in a successful state, the first node further needs to obtain a second target identifier. If the first node determines that the target identifier is different from the identifier of the first node, the first node can determine in a timely manner that the second node unsuccessfully receives, in the first access timeslot, the access request information sent by the first node. It can be learned that the second node may send the full-duplex feedback information and the target identifier, so that the first node can determine in a timely manner that the second node unsuccessfully receives, in the first access timeslot, the access request information sent by the first node. In this case, the first node does not join a DTQ for queuing up, and therefore time is not wasted. This reduces an access delay of the first node determines a processing action of the first node after an error occurs in a DQ algorithm, and ensures correct running of the DQ algorithm after the error occurs, to ensure normal running of full-duplex transmission.

According to the second aspect of the embodiments of the present invention, in a first implementation of the second aspect of the embodiments of the present invention, step C of sending, by the second node, a target identifier to the first node specifically includes: sending, by the second node, a physical frame to the first node, where the target identifier is carried in the physical frame, and the physical frame is sent by the second node after the second node has sent the full-duplex feedback information.

It should be noted that in this embodiment, the physical frame is a first physical frame sent by the second node to a third node, and the first physical frame is sent by the second node to the third node in a next transmission window. For detailed descriptions of the physical frame, refer to the first aspect.

It should be noted that a destination receiving node of payload information carried in the first physical frame is the third node, and a destination receiving node of information about the target identifier carried in a frame header of the first physical frame is the first node. The first physical frame needs to be received both by the third node and the first node, and both the first node and the third node are within a transmission coverage area of the second node. Therefore, the best manner for sending the first physical frame is a broadcast or multicast manner. In this way, all nodes within the coverage area for sending a signal by the second node can receive the first physical frame, so that the first node can parse the first physical frame to obtain the target identifier.

According to the second aspect of the embodiments of the present invention, in a second implementation of the second aspect of the embodiments of the present invention, step C of sending, by the second node, a target identifier to the first node specifically includes: sending, by the second node to the first node, the full-duplex feedback information carrying the target identifier.

It should be noted that the sending, by the second node to the first node, the full-duplex feedback information carrying the target identifier in the second implementation of the second aspect and step B of sending, by the second node, full-duplex feedback information to the first node in the second aspect are same actions. The second node does not need to separately send the full-duplex feedback information once again for sending the target identifier, but the first node can obtain the target identifier directly from the received full-duplex feedback information after step B is performed. This is because the target identifier is carried in the full-duplex feedback information, or in other words, the target identifier and the full-duplex feedback information are sent together by carrying them in a same physical frame (a fourth physical frame).

A third aspect of the embodiments of the present invention provides a full-duplex transmission method, including:

step A: a second node receives, in a first access timeslot, access request information sent by a first node:

step B: the second node sends full-duplex feedback information to the first node;

step C: the second node sends a target identifier to the first node when the full-duplex feedback information indicates that the first access timeslot is in a successful state;

step D: the second node receives, in a negative acknowledgment NACK timeslot, a NACK signal sent by the first node, where the negative acknowledgment NACK timeslot appears after the first node receives the full-duplex feedback information; and step E: if the second node detects that there is the NACK signal in the NACK timeslot, the second node sends queue adjustment indication information to the first node, where the queue adjustment indication information is used to indicate a target queue location, and the target queue location is any location in a conflict resolution queue or a location following a queue end location in a conflict resolution queue.

In the method described in this aspect, if the second node indicates, in the full-duplex feedback information, that the first access timeslot is in a successful state, the second node needs to send the target identifier, where the target identifier is an identifier of the first node that sends, in the first access timeslot, the access request information successfully received by the second node. When finding that the first access timeslot in which the first node sends the access request information is indicated as being in a successful state, the first node further needs to obtain a second target identifier. When the access request information is sent in the first access timeslot but the target identifier indicated by the second node does not match the identifier of the first node, the first node can determine that the access request information that is sent by the first node in the first access timeslot is unsuccessfully received by the second node. Therefore, the first node sends the NACK signal in the NACK timeslot to indicate the case to the second node, and the second node also needs to detect whether there is a NACK signal in the NACK timeslot, to determine whether the case really occurs. Alternatively, if the second node indicates, in the full-duplex feedback information, that the first access timeslot is in an idle state, a cause for the case may be that a link is shielded, interference occurs, or the like. As a result, the access request information sent by the first node in the first access timeslot is unsuccessfully received by the second node, and then the second node determines that the first access timeslot is in an idle state. In this case, the second node also needs to detect whether there is a NACK signal in the NACK timeslot, to determine whether the case occurs. It should be noted that, it is assumed that the full-duplex feedback information indicates that one second access timeslot (as-sumed to be a timeslot 1) is in a successful state, and indicates that another second access timeslot (assumed to be a timeslot 2) is in an idle state. In addition, it is assumed that one first node (assumed to be a node A) sends access request information to the second node in the timeslot 1, and another first node (assumed to be a node B) sends access request information to the second node in the timeslot 2. Moreover, it is also assumed that the first node (assumed to be the node A) determines that the target identifier indicated by the second node is different from an identifier of the node A. Then, both the two cases occur obviously. Therefore, both the node A and the node B send NACK signals to the second node in a NACK timeslot. Because there is only one NACK timeslot, the NACK signals sent by the node A and the node B overlap. The second node can only detect that a first node sends a NACK signal in the NACK timeslot, but cannot determine whether the NACK signal is the NACK signal sent by the node A or the NACK signal sent by the node B. In contrast, in this embodiment of the present invention, the second node does not need to determine whether the node A or the node B sends the NACK signal, and the second node only needs to detect whether there is a NACK signal. If the second node detects that there is a NACK signal in a NACK timeslot, the second node can determine that at least two first nodes send access request information to the second node in a second access timeslot in a successful state as indicated by the full-duplex feedback information, but access request information of at least one first node is unsuccessfully received by the second node. The second node can further determine that at least one first node sends access request information to the second node in a second access timeslot in an idle state as indicated by the full-duplex feedback information, but the access request information is unsuccessfully received by the second node. Based on such judgments, the second node can send the queue adjustment indication information to the first node, to indicate the target queue location. All first nodes sending NACK signals queue up at the target queue location. In this way, the first node can determine in a timely manner a case in which the access request information sent by the first node is unsuccessfully received by the second node, and notify the second node of a determining case in a timely manner, so that the second node can lean in a timely manner the case in which the access request information sent by the first node is unsuccessfully received by the second node. Then, the second node can adjust a CRQ length, and add a queue location to the end of the CRQ for the first node. This avoids that time is wasted because the first node mistakenly considers that the first node has joined a DTQ for queuing up, reduces an access delay of the first node, determines a processing action of the first node after an error occurs in a DQ algorithm, and ensures correct running of the DQ algorithm after the error occurs.

It should be noted that in another possible implementation, after the second node sends the full-duplex feedback information, there are a plurality of NACK timeslots, for example, three NACK timeslots. Each NACK timeslot is corresponding to one first access timeslot. If the first node sends access request information in a corresponding first access timeslot, and the full-duplex feedback information indicates that the first access timeslot is in a successful state, but the target identifier indicated by the second node is different from the identifier of the first node, or the full-duplex feedback information indicates that the first access timeslot is in an idle state, the first node sends a NACK signal to the second node in a NACK timeslot corresponding to the first access timeslot.

A specific quantity of NACK timeslots is not limited in the present invention.

A fourth aspect of the embodiments of the present invention provides a first node, including:

a sending module, configured to send access request information to a second node in a first access timeslot;

a receiving module, configured to receive full-duplex feedback information sent by the second node; where the receiving module is further configured to receive a target identifier sent by the second node, when the full-duplex feedback information indicates that the first access timeslot is in a successful state; and a processing module, configured to: when the first node determines that the target identifier is different from an identifier of the first node, or when the full-duplex feedback information indicates that the first access timeslot is in an idle state, determine a target queue location of the first node in the conflict resolution queue.

When the first node described in this aspect determines that the first access timeslot indicated by the full-duplex feedback information is in a successful state, and that the target identifier is different from the identifier of the first node, or the second node indicates, in the full-duplex feedback information, that the first access timeslot is in an idle state, the first node can determine in a timely manner that the second node unsuccessfully receives, in the first access timeslot, the access request information sent by the first node. In this case, the first node can determine in a timely manner that the first node needs to join the CRQ for queuing up, instead of joining a DTQ for queuing up. This reduces an access delay of the first node. In addition, a processing action of the first node after an error occurs in a DQ algorithm is determined in this embodiment of the present invention. To be specific, after determining that an error occurs during receiving of the access request information by the second node, the first node determines a specific queue location of the first node in the CRQ directly based on the full-duplex feedback information. This ensures normal running of full-duplex transmission after the error occurs.

According to the fourth aspect of the embodiments of the present invention, in a first implementation of the fourth aspect of the embodiments of the present invention, the processing module is further configured to: if the full-duplex feedback information indicates that there is only one second access timeslot in a conflicted state, determine that the target queue location is a queue location of the second access timeslot in the conflict resolution queue.

According to the fourth aspect of the embodiments of the present invention, in a second implementation of the fourth aspect of the embodiments of the present invention, the processing module is further configured to: if the full-duplex feedback information indicates that there are a plurality of second access timeslots in a conflicted state, determine that the target queue location is a queue location, in the conflict resolution queue, of a second access timeslot in the plurality of second access timeslots that is closest to the first access timeslot.

According to the second implementation of the fourth aspect of the embodiments of the present invention, in a third implementation of the fourth aspect of the embodiments of the present invention, the processing module is further configured to: if the full-duplex feedback information indicates that there are a plurality of second access timeslots in a conflicted state, and two second access timeslots in the plurality of second access timeslots are closest to the first access timeslot, determine that the target queue location is a queue location, in the conflict resolution queue, of a second access timeslot in a higher rank in the two second access timeslots that are closest to the first access timeslot.

According to the fourth aspect of the embodiments of the present invention, in a fourth implementation of the fourth aspect of the embodiments of the present invention, the processing module is further configured to: if the full-duplex feedback information indicates that all access timeslots are in a successful state or an idle state, when the conflict resolution queue is not empty, determine that the target queue location is a queue end location in the conflict resolution queue.

According to the fourth aspect of the embodiments of the present invention, in a fifth implementation of the fourth aspect of the embodiments of the present invention, the processing module includes:

a sending unit, configured to send a NACK signal in a negative acknowledgment NACK timeslot, where the negative acknowledgment NACK timeslot appears after the receiving module receives the full-duplex feedback information;

a receiving unit, configured to receive queue adjustment indication information sent by the second node, where the queue adjustment indication information is used to indicate the target queue location, and the target queue location is any location in the conflict resolution queue or a location following a queue end location in the conflict resolution queue; and a processing unit, configured to determine the target queue location based on the queue adjustment indication information.

According to the fourth aspect of the embodiments of the present invention, in a sixth implementation of the fourth aspect of the embodiments of the present invention, the processing module is further configured to: if the full-duplex feedback information indicates that there are a plurality of second access timeslots in a conflicted state, determine that the target queue location is a queue location, in the conflict resolution queue, of any one of the plurality of second access timeslots.

According to the fourth aspect of the embodiments of the present invention, in a seventh implementation of the fourth aspect of the embodiments of the present invention, if the full-duplex feedback information indicates that all access timeslots are in a successful state or an idle state, the processing module is further configured to: when the conflict resolution queue is not empty, determine that the target queue location is any location in the conflict resolution queue.

According to the fourth aspect of the embodiments of the present invention, in an eighth implementation of the fourth aspect of the embodiments of the present invention, the receiving module is further configured to receive a physical frame sent by the second node, where the target identifier is carried in the physical frame, and the physical frame is sent by the second node after the second node has sent the full-duplex feedback information; or the receiving module is further configured to receive the full-duplex feedback information, where the target identifier is carried in the full-duplex feedback information.

It should be noted that, that the receiving module receives, in the eighth implementation of the fourth aspect, the full-duplex feedback information, where the target identifier is carried in the full-duplex feedback information, and that the receiving module is configured to receive full-duplex feedback information sent by the second node in the fourth aspect are same actions. To be specific, the receiving module does not need to separately receive the full-duplex feedback information once again for receiving the target identifier, but the receiving module obtains the target identifier directly from the full-duplex feedback information after the full-duplex feedback information is received. This is because the target identifier is carried in the full-duplex feedback information, or in other words, the target identifier and the full-duplex feedback information are sent together by carrying them in a same physical frame (a fourth physical frame).

It should be noted that in the eighth implementation of the fourth aspect, the physical frame is a first physical frame sent by the second node to a third node, and the first physical frame is sent by the second node to the third node in a next transmission window. For detailed descriptions of the physical frame, refer to the first aspect.

The first node described in this aspect is used. When the first node determines that the first access timeslot indicated by the full-duplex feedback information is in a successful state, and that the target identifier obtained by the first node is different from the identifier of the first node, the first node can determine in a timely manner that the second node unsuccessfully receives, in the first access timeslot, the access request information sent by the first node. In this case, the first node does not join the DTQ for queuing up, and therefore time is not wasted. This reduces the access delay of the first node, determines the processing action of the first node after an error occurs in the DQ algorithm, and ensures correct running of the DQ algorithm after the error occurs, to ensure normal running of full-duplex transmission.

According to any one of the fourth aspect of the embodiments of the present invention to the eighth implementation of the fourth aspect of the embodiments of the present invention, in a ninth implementation of the fourth aspect of the embodiments of the present invention, the processing module is further configured to: if the processing module determines that the target identifier is the same as the identifier of the first node, determine that the first node joins a data transmission queue for queuing up.

The first node described in this aspect is used. The first node can determine that the second node successfully receives the access request information that is sent by the first node in the first access timeslot, only when the first node determines that the first access timeslot indicated by the full-duplex feedback information is in a successful state, and that the target identifier is the same as the identifier of the first node. In this case, the first node determines that the first node needs to join the DTQ for queuing up. This effectively ensures normal running of full-duplex transmission.

A fifth aspect of the embodiments of the present invention provides a second node, including:

a receiving module, configured to receive, in a first access timeslot, access request information sent by a first node: and a sending module, configured to send full-duplex feedback information to the first node; where the sending module is further configured to send a target identifier to the first node when the full-duplex feedback information indicates that the first access timeslot is in a successful state.

The second node described in this aspect is used. The second node sends the target identifier to the first node when the full-duplex feedback information indicates that the first access timeslot is in a successful state. If the first node determines that the target identifier is different from an identifier of the first node, the first node can determine in a timely manner that the second node unsuccessfully receives, in the first access timeslot, the access request information sent by the first node. It can be learned that the second node may send the full-duplex feedback information and the target identifier, so that the first node can determine in a timely manner that the second node unsuccessfully receives, in the first access timeslot, the access request information sent by the first node. In this case, the first node does not join a DTQ for queuing up, and therefore time is not wasted. This reduces an access delay of the first node, determines a processing action of the first node after an error occurs in a DQ algorithm, and ensures correct running of the DQ algorithm after the error occurs, to ensure normal running of full-duplex transmission.

According to the fifth aspect of the embodiments of the present invention, in a first implementation of the fifth aspect of the embodiments of the present invention, the sending module is further configured to send a physical frame to the first node, where the target identifier is carried in the physical frame, and the physical frame is sent by the sending module after the sending module has sent the full-duplex feedback information.

It should be noted that in this embodiment, the physical frame is a first physical frame sent by the second node to a third node, and the first physical frame is sent by the second node to the third node in a next transmission window. For detailed descriptions of the physical frame, refer to the first aspect.

According to the fifth aspect of the embodiments of the present invention, in a second implementation of the fifth aspect of the embodiments of the present invention, the sending module is configured to send, to the first node, the full-duplex feedback information carrying the target identifier.

It should be noted that, that the sending module is configured to send, to the first node, the full-duplex feedback information carrying the target identifier in the second implementation of the fifth aspect and that the sending module is configured to send full-duplex feedback information to the first node in the fifth aspect are same actions. The sending module does not need to separately send the full-duplex feedback information once again for sending the target identifier. This is because the target identifier is carried in the full-duplex feedback information, or in other words, the target identifier and the full-duplex feedback information are sent together by carrying them in a same physical frame (a fourth physical frame).

A sixth aspect of the embodiments of the present invention provides a second node, including:

a first receiving module, configured to receive, in a first access timeslot, access request information sent by a first node;

a first sending module, configured to send full-duplex feedback information to the first node; where the first sending module is further configured to send a target identifier to the first node when the full-duplex feedback information indicates that the first access timeslot is in a successful state;

a second receiving module, configured to receive, in a negative acknowledgment NACK timeslot, a NACK signal sent by the first node, where the negative acknowledgment NACK timeslot appears after the first node receives the full-duplex feedback information; and a second sending module, configured to: if the second receiving module detects that there is the NACK signal in the NACK timeslot, send queue adjustment indication information to the first node, where the queue adjustment indication information is used to indicate a target queue location, and the target queue location is any location in a conflict resolution queue or a location following a queue end location in the conflict resolution queue.

The second node described in this aspect is used. If the second node indicates, in the full-duplex feedback information, that the first access timeslot is in a successful state, the second node needs to send the target identifier. The access request information is sent in the first access timeslot but the target identifier indicated by the second node does not match an identifier of the first node. In this case, the first node can determine that the access request information that is sent by the first node in the first access timeslot is unsuccessfully received by the second node, and then the first node can send the NACK signal in the NACK timeslot. If the second node detects that there is the NACK signal in the NACK timeslot, the second node can determine that the second node unsuccessfully receives the access request information sent by the first node, and then the second node can send the queue adjustment indication information to the first node, to indicate the target queue location. All first nodes sending NACK signals queue up at the target queue location. In this way, the first node can determine in a timely manner a case in which the access request information sent by the first node is unsuccessfully received by the second node, and may further notify the second node of the case, so that the second node can determine in a timely manner the case in which the access request information sent by the first node is unsuccessfully received by the second node. Then, the second node can adjust a CRQ length, and add a queue location to the end of the CRQ for the first node. This avoids that time is wasted because the first node mistakenly considers that the first node has joined a DTQ for queuing up, reduces an access delay of the first node, determines a processing action of the first node after an error occurs in a DQ algorithm, and ensures correct running of the DQ algorithm after the error occurs.

A seventh aspect of the embodiments of the present invention provides a node, including a processor and a memory. The memory stores a computer-readable program. The processor runs the program in the memory to complete the method in either of the first aspect and the second aspect in the embodiments of the present invention.

An eighth aspect of the embodiments of the present invention provides a computer-readable storage medium, where the medium includes an instruction. When the instruction is run on a node, the node is enabled to perform the method in either of the first aspect and the second aspect in the embodiments of the present invention.

A ninth aspect of the embodiments of the present invention provides a computer program product including an instruction. When the computer program product is run on a node, the node is enabled to perform the method in either of the first aspect and the second aspect in the embodiments of the present invention.

The present invention provides the full-duplex transmission method and the related device. The method includes: sending, by the first node, the access request information to the second node in the first access timeslot; receiving, by the first node, the full-duplex feedback information sent by the second node; and when the full-duplex feedback information indicates that the first access timeslot is in a successful state, and the first node determines that the target identifier sent by the second node is different from the identifier of the first node, determining, by the first node, the target queue location of the first node in the conflict resolution queue; or when the full-duplex feedback information indicates that the first access timeslot is in an idle state, determining, by the first node, the target queue location of the first node in the conflict resolution queue. It can be learned that according to the method in the present invention, if the first node determines in a timely manner that the second node unsuccessfully receives, in the first access timeslot, the access request information sent by the first node, the first node joins the conflict resolution queue in a timely manner for queuing up. This reduces the access delay of the first node, and ensures normal running of the full-duplex transmission.

DESCRIPTION OF EMBODIMENTS

For better understanding of a full-duplex transmission method described in embodiments of the present invention, the following first describes visible light communication to which the full-duplex transmission method described in the embodiments is applied.

Figure 3:
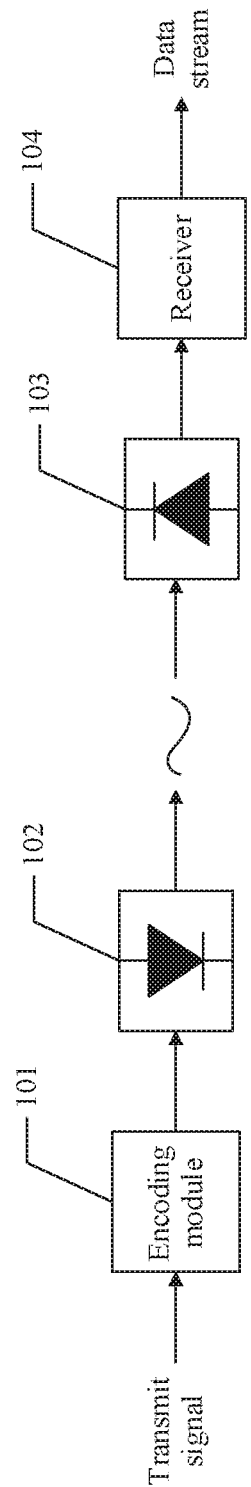
FIG. 3 is a schematic transmission diagram of visible light communication according to the prior art.

Visible light communication (VLC) is a communication manner in which an electromagnetic wave within a range of a visible light frequency band is used as a transmission medium for communication. As shown in FIG. 3, a VLC transmit end sends, to a drive circuit 102, a signal m (t) obtained after an encoding module 101 modulates and encodes a transmit signal "Input", to obtain an electrical signal; the electrical signal is sent to a light emitting diode (LED); and then the light emitting diode converts, through electrical-to-optical conversion, the electrical signal into an optical signal x (t) for sending. An LED drive current has been modulated from the transmit signal, and a change of the drive current in the drive circuit 102 causes light intensity of an LED to change. Therefore, in essence, the VLC communication implements signal transmission by changing intensity of an LED light source. Because light intensity changes quite frequently, and human eyes are not conscious of a change of a light source, high-speed signal transmission can be completed while a basic function of illumination is implemented. A VLC receives end detects received LED light by using a photodetector (PD) 103 or an optical lens (lens), and the photodetector converts the received modulated optical signal into an electrical signal and inputs the electrical signal into a receiver 104. The electrical signal is demodulated and decoded in the receiver, to restore a transmitted data stream "Output".

A VLC network usually includes one central control node and a plurality of terminal devices. The central control node may also be referred to as a coordinator, an access point (AP), a domain master (DM), or the like. The terminal device may also be referred to as a station (STA), an endpoint (EP), user equipment UE), or the like. The VLC network may also be referred to as visible-light communication personal area network (VPAN), a domain, a local area network (LAN), or the like. The central control node is a master node of the VLC network, provides visible-light network access for the EP, and manages and maintains running of the domain. The EP is connected to the VLC network by accessing a first node. When the VLC communication is applied to a visible light domain, for a VLC network, the central control node is usually an LED on a ceiling, and the terminal device is an electronic product integrated with a VLC transceiver, for example, a smartphone, a tablet computer, or a personal computer (PC).

Full-duplex communication means that one device can receive data sent by another device and can send data to another device at a same moment. Full-duplex transmission includes symmetric full-duplex transmission and asymmetric full-duplex transmission. The symmetric full-duplex transmission is full-duplex transmission between two devices, in which a device A receives data sent by a device B to the device A while sending data to the device B. The asymmetric full-duplex transmission is full-duplex transmission among three devices, in which a device A receives data sent by a device C to the device A while sending data to a device B, where the device B and the device C are two different devices. The symmetric full-duplex transmission is a special example of the asymmetric full-duplex transmission. To be specific, if the device B and the device C are same devices, the asymmetric full-duplex transmission amounts to the symmetric full-duplex transmission. The full-duplex transmission includes transmission in two directions. Transmission that is first established is first transmission, and transmission that is established later is second transmission.

Figure 1:
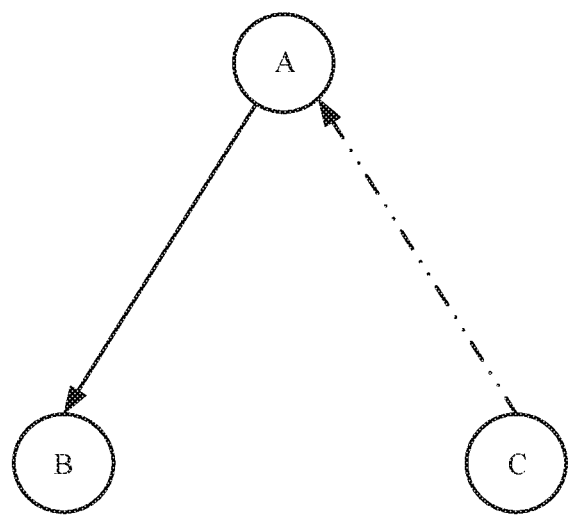
FIG. 1 is a schematic diagram of a topology structure of full-duplex transmission according to the prior art.

FIG. 1 shows a topology structure of asymmetric full-duplex transmission. A node A receives data from a node C while sending data to a node B. In the prior art, non-contention-based first transmission is first established between the node A and the node B, and then contention-based second transmission is established between the node C and the node A. In the present invention, a sending node in the second transmission (namely, the node C) is referred to as a first node; a receiving node in the second transmission, namely, a sending node in the first transmission (namely, the node A) is referred to as a second node; and a receiving node in the first transmission (namely, the node B) is referred to as a third node. Because the second transmission is contention-based transmission, all nodes that need to send data to the second node can participate in contention in the second transmission. To be specific, a plurality of first nodes (a plurality of nodes C) may need to send data to the second node. In this case, how to determine a specific first node with which the second node establishes the second transmission is an issue to be resolved for full-duplex transmission.

For better understanding of the method described in the embodiments of the present invention, the first node and the third node described in the embodiments of the present invention are user equipments described above, and the second node is the coordinator described above. The following describes how to determine, in a contention-based manner, a specific first node with which the second node establishes the second transmission.

Figure 2:
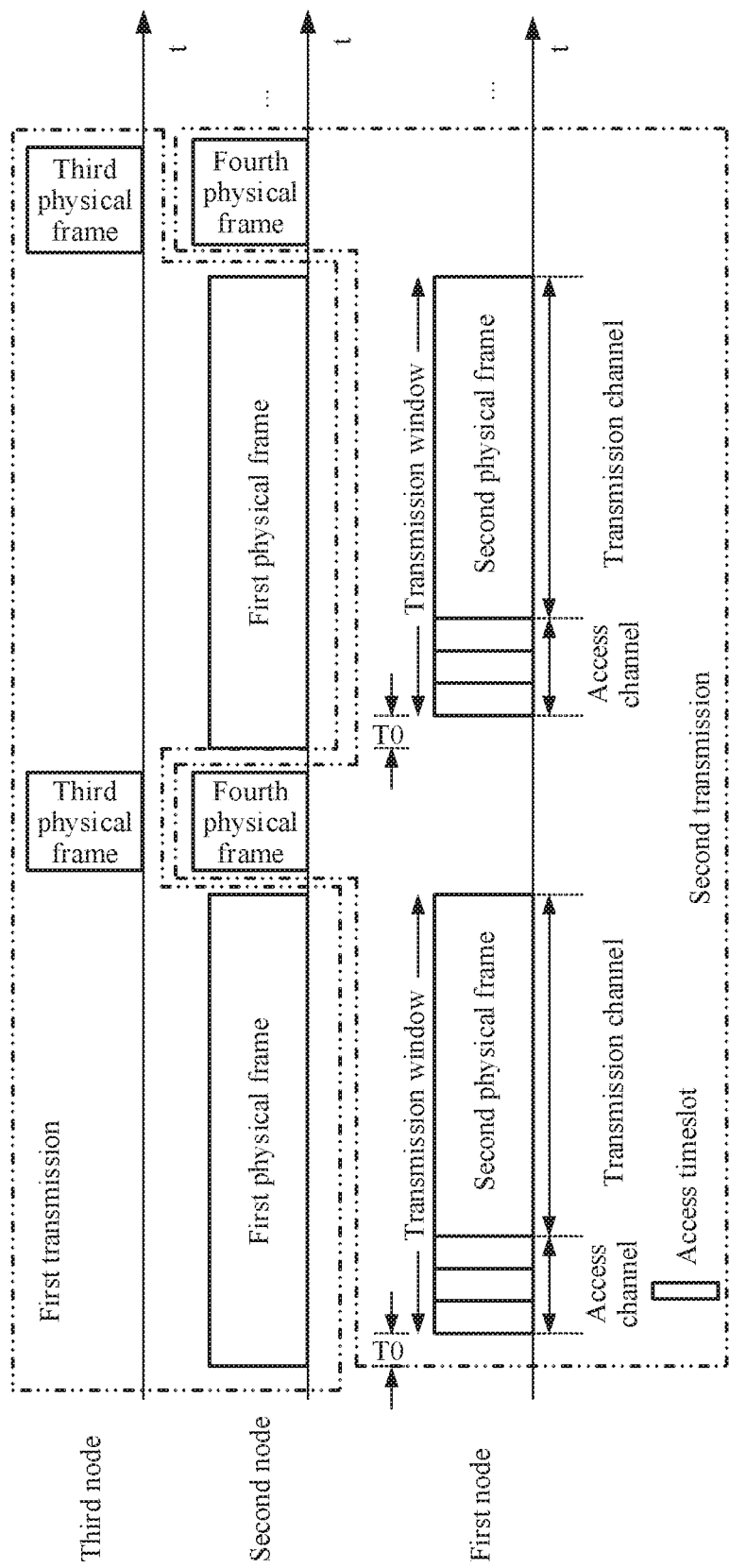
FIG. 2 is a schematic diagram of full-duplex transmission according to the prior art.

As shown in FIG. 2, each time the second node sends a first physical frame to the third node in the first transmission, the uplink channel in a direction from the first node to the second node correspondingly has a transmission window (TW). The first node sends access request information or a second physical frame to the second node in the transmission window.

It should be noted that, it can be considered that a link in a direction from the second node to the first node or the third node is a downlink, and a channel from the second node to the first node or from the second node to the third node is a downlink channel. A link in a direction from the first node or the third node to the second node is an uplink, and a channel from the first node to the second node or from the third node to the second node is an uplink channel.

It should be noted that the first physical frame is a physical frame sent by the second node to the third node, and the second physical frame is a physical frame sent by the first node to the second node. The physical frame described herein includes a preamble, a frame header, and a payload. The preamble is used for synchronization, channel estimation, and the like. The frame header includes control information. The payload is used for carrying service data. There are many different types of physical frames, such as an MSG frame and an ACK frame. Some types of physical frames may not include a payload, for example, an ACK frame.

A difference between start time of a transmission window (TW) and transmission start time for a first physical frame sent by the second node to the third node is TO, where TO is a time required by the first node to detect and parse out a frame header of the first physical frame. One TW includes one (or zero) access channel and one transmission channel, and the access channel further includes several access timeslots (for example, three access timeslots in FIG. 2) with equal duration. The access timeslot on the access channel is used by the first node to send access request information to the second node, and the transmission channel is used by the first node to send a second physical frame to the second node in a non-contention-based manner. The first node can send the second physical frame to the second node in a non-contention-based manner, only after successfully sending the access request information to the second node.

There may be two different configuration manners for a transmission window (TW). In a first configuration manner, the transmission window (TW) only includes one transmission channel, but does not include an access channel. In a second configuration manner, the transmission window (TW) includes one access channel and one transmission channel. The second node indicates, in full-duplex indication information, whether the transmission window (TW) includes an access channel. If the TW includes an access channel, the transmission channel starts after the access channel ends. If the TW includes no access channel, the transmission channel starts after downlink transmission has started for TO.

End time of the TW is indicated by "transmission end time" in the full-duplex indication information, and the end time of the TW cannot be later than "transmission end time" indicated in the full-duplex indication information. FIG. 2 is merely an example for description. In the figure, a transmission window (TW) includes one access channel and one transmission channel, the access channel includes three access timeslots with equal duration, and end time of the TW is equal to transmission end time of a first physical frame sent by the second node to the third node.

When the second node sends a first physical frame to the third node, the first node sends access request information to the second node in an access timeslot, and sends a second physical frame to the second node over the transmission channel. It should be noted that there may be a plurality of first nodes sending access request information to the second node.

The first node needs to determine starting of the TW by detecting a frame header of the first physical frame sent by the second node, and send the access request information and the second physical frame based on the full-duplex indication information carried in the frame header of the first physical frame. Specifically, the full-duplex indication information specifically includes the following fields: a "transmission end time" field, an "uplink channel configuration" field, an "indicator indicative of an empty CRQ" field, and a "transmission device identifier" field.

(1) The "transmission end time" field is used to indicate latest end time at which a first node sends a first physical frame to the second node, namely, end time of the TW. The end time of the TW cannot be later than "transmission end time".

(2) The "uplink channel configuration" field is used to indicate whether an uplink channel includes an access channel. If the uplink channel includes an access channel, the TW includes one access channel and one transmission channel. If the uplink channel includes no access channel, the TW includes a transmission channel.

If the "uplink channel configuration" field indicates that the TW includes an access channel, the first node sends access request information to the second node over the access channel. A specific method for sending access request information is: The first node randomly selects one access timeslot from the three access timeslots, and sends the access request information to the second node in the selected access timeslot.

(3) The "indicator indicative of an empty CRQ" field is used to indicate whether a conflict resolution queue (CRQ) is empty. If the CRQ is empty, it indicates that no first node queues up in the CRQ; if the CRQ is not empty, it indicates that a first node queues up in the CRQ. For a function and descriptions of the CRQ, refer to subsequent steps. Details are not described herein.

Because the first node randomly selects an access timeslot to send access request information, a plurality of first nodes may select a same access timeslot to send access request information to the second node. As a result, a conflict occurs, and the second node fails in receiving the access request information. If a conflict occurs on the second node when first nodes send access request information, the first nodes need to retransmit the access request information.

Based on whether access request information sent in each access timeslot is successfully received by the second node, a status of each access timeslot may be one of the three states: a successful state, a conflicted state, and an idle state. The successful state means that the second node successfully receives access request information sent in the access timeslot. The conflicted state means that the second node determines that at least two first nodes send access request information in the access timeslot. The idle state means that the second node detects no signal in the access timeslot.

Because each first node needs to learn a status of an access timeslot selected by the first node to send access request information, the second node needs to detect a signal in each access timeslot and indicate a status of each access timeslot. If the second node detects an effective preamble and frame header of a physical frame, the second node determines that the access timeslot is in a successful state. If the second node detects an effective physical frame preamble but does not detect an effective physical frame header, the second node determines that the access timeslot is in a conflicted state. If the second node does not detect an effective physical frame preamble, the second node determines that the access timeslot is in an idle state.

After the detection ends, the second node further needs to indicate, in full-duplex feedback information, the status that is of each access timeslot and that is detected by the second node.

If an access timeslot in which the first node sends access request information is indicated as being in a conflicted state by the second node, the first node needs to join a conflict resolution queue (CRQ) to queue up for retransmitting the access request information. The second node and each first node that participates in contention need to maintain two different queues: the conflict resolution queue (CRQ) and a data transmission queue (DTQ). The CRQ is used to manage a conflict that occurs in a process of sending access request information, and the DTQ is used to manage a process of sending a second physical frame by the first node in a non-contention-based manner after the first node successfully sends access request information. Both the CRQ and the DTQ need to be maintained and managed by maintaining two counters by the second node and each first node that participates in contention.

One counter that needs to be maintained for the CRQ is a conflict resolution queue length counter, and the CRQ length counter is used to indicate a CRQ length. The other counter that needs to be maintained for the CRQ is a CRQ location counter, and the CRQ location counter is used to indicate a queue location of a first node in the CRQ.

One counter that needs to be maintained for the DTQ queue is a transmission queue length counter, and the DTQ length counter is used to indicate a DTQ length. The other counter that needs to be maintained for the DTQ queue is a DTQ location counter, and the DTQ location counter is used to indicate a queue location of a first node in the DTQ.

(4) The "transmission device identifier" field is used to indicate an identifier of a first node that sends a second physical frame to the second node over the transmission channel.

After the transmission channel starts, the first node indicated by the "transmission device identifier" field (namely, a first node that queues up in the DTQ) sends the second physical frame to the second node over the transmission channel. Transmission end time of the second physical frame cannot be later than the time indicated by the "transmission end time" field.

As shown in FIG. 2, after the transmission channel ends, when the third node replies to the second node with a third physical frame (an ACK frame) in the first transmission, the second node sends a fourth physical frame to the first node in the second transmission. The fourth physical frame includes the full-duplex feedback information, and the full-duplex feedback information indicates the status of each access timeslot on the access channel in the TW. The first node determines, based on the full-duplex feedback information, whether the access request information and the second physical frame sent by the first node are successfully received by the second node; and decides whether the first node needs to join the CRQ for queuing up or join the DTQ for queuing up and a specific queue location of the first node in the queue.

Determining, by the first node, the specific queue location of the first node in the CRQ or the DTQ is equivalent to a process of updating the CRQ length counter, the DTQ length counter, the CRQ location counter, and the DTQ location counter that are maintained by the first node. A specific method for updating the counters by the first node based on the full-duplex feedback information is as follows.

First, the first node may determine, based on the status of the access timeslot indicated by the full-duplex feedback information, whether the first node needs to join the CRQ for queuing up or join the DTQ for queuing up.

If the full-duplex feedback information indicates that one access timeslot is in a conflicted state, all first nodes sending access request information in the access timeslot queue up at a same location of the CRQ. Queue locations, in the CRQ, of the first nodes on which a conflict occurs in a same access timeslot are the same. If the full-duplex feedback information indicates that statuses of a plurality of access timeslots are all conflicted states, first nodes sending access request information in different access timeslots queue up in the CRQ in chronological order of the selected access timeslots.

If the full-duplex feedback information indicates that one access timeslot is in a successful state, first nodes sending access request information in the access timeslot join the DTQ for queuing up. If the full-duplex feedback information indicates that statuses of a plurality of access timeslots are all successful states, first nodes sending access request information in different access timeslots queue up in the DTQ in chronological order of the selected access timeslots.

Next, after determining whether the first node needs to join the CRQ or the DTQ, the first node needs to determine a specific queue location of the first node in the CRQ or the DTQ, that is, determine the CRQ location counter or the DTQ location counter of the first node.

In addition to the status of each access timeslot, the full-duplex feedback information further indicates a "CRQ length" and a "DTQ length". The "CRQ length" represents a total queuing length of the CRQ after a current transmission window, and the "DTQ length" represents a total queuing length of the DTQ after the current transmission window. Each first node sets a value of a respective CRQ length counter or DTQ length counter to a value indicated by the "CRQ length" or "DTQ length" fields in the full-duplex feedback information. A method for determining, by each first node, a value of a respective CRQ location counter or DTQ location counter is as follows.

It is assumed that the full-duplex feedback information indicates that statuses of M ($0 \leq M \leq 3$) access timeslots are successful states, statuses of N ($0 \leq N \leq 3$) access timeslots are conflicted states, and statuses of K ($0 \leq K \leq 3$) access timeslots are idle states, where M+N+K=3. In this case, each first node sending access request information in an access timeslot in the current transmission window updates a value of a respective CRQ location counter or DTQ location counter according to the following rule:

if an access timeslot in which a first node sends access request information is an $i^{th}$ access timeslot in the M access timeslots whose statuses are successful states, a value of a DTQ location counter of the first node is updated to: DTQ length−M+i; or if an access timeslot in which a first node sends access request information is a $j^{th}$ access timeslot in the N access timeslots whose statuses are conflicted states, a value of a CRQ location counter of the first node is updated to: CRQ length−N+j.

In addition to updating the location counters based on the full-duplex feedback information, in each transmission window, if the full-duplex indication information in the frame header of the first physical frame indicates that the CRQ is not empty, only a first node that queues up at a queue start location of the CRQ can randomly select an access timeslot and send access request information, a first node that queues up at another location of the CRQ subtracts 1 from a value of a CRQ location counter of the first node in each transmission window. A new first node (namely, a first node that imposes a requirement for sending a second physical frame to the second node) cannot randomly select an access timeslot or send access request information to the second node. The new first node can randomly select an access timeslot and send access request information to the second node, only when the CRQ is empty. In each transmission window, only a first node located at a queue start location of the DTQ can send a second physical frame to the second node over a transmission channel, and a first node that queues up at another location of the DTQ, that is, at a location other than the queue start location of the DTQ, subtracts 1 from a value of a DTQ location counter of the first node in each transmission window.

In the foregoing process, a TW continually appears in the second transmission provided that the second node continually sends a first physical frame to the third node in the first transmission. Then, the foregoing processes of sending access request information and a second physical frame and maintaining and updating each counter are also continually performed.

In the prior art, each first node can queue up at a correct location of the CRQ or the DTQ on the premise that the first node and the second node have a same opinion about a status of an access timeslot. However, in an actual case, affected by a difference between conditions of channels between the second node and different first nodes, interference that occurs on a channel, or the like, the second node and the first node may have different opinions about a status of a same access timeslot. When the second node and the first node have different opinions about the status of the same access timeslot, or when the first node does not receive the full-duplex feedback information sent by the second node, the first node enters an indefinite state. To be specific, the first node is uncertain about whether the first node needs to join the conflict resolution queue for queuing up or join the data transmission queue for queuing up, or does not know a specific queue location of the first node. When this case occurs, the foregoing prior-art full-duplex transmission method cannot be normally implemented.

Figure 4:
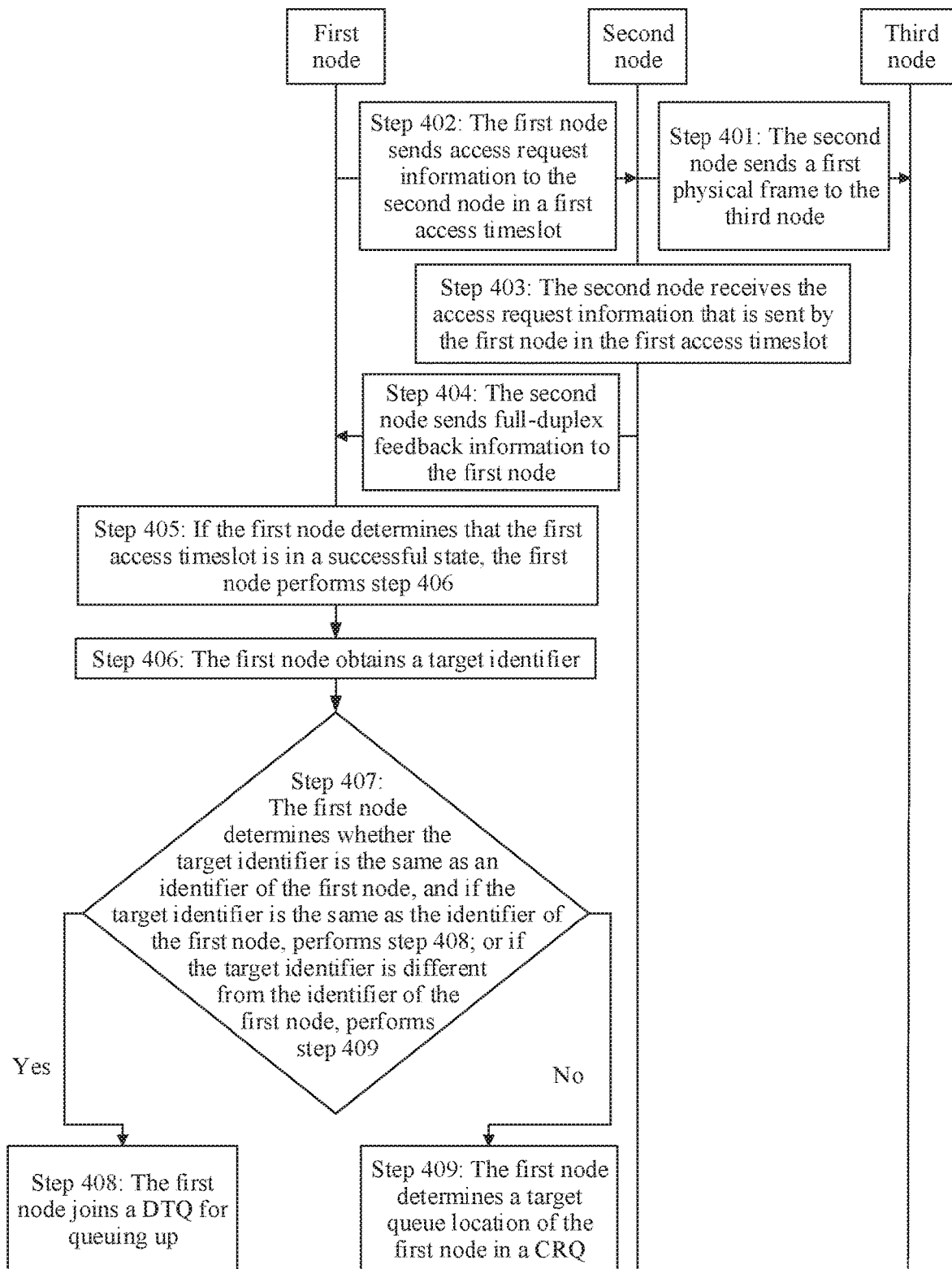
FIG. 4 is a step flowchart of an embodiment of a full-duplex transmission method according to the present invention.

With reference to FIG. 4, the following details a specific execution process of an embodiment of a full-duplex transmission method described in the present invention. FIG. 4 is a step flowchart of an embodiment of a full-duplex transmission method according to the present invention.

Step 401: A second node sends a first physical frame to a third node.

The second node described in this embodiment sends the first physical frame to the third node.

Step 402: A first node sends access request information to the second node in a first access timeslot.

It should be noted that in a process of performing step 401 in this embodiment, step 402 described in this embodiment is performed. In other words, execution time of step 401 overlaps execution time of step 402. Referring to FIG. 2, a transmission window overlaps sending time of a first physical frame by the second node, and step 402 is performed on an access channel in a transmission window shown in FIG. 2. Therefore, execution time of step 401 also overlaps execution time of step 402.

It should be noted that the method for sending access request information, a structure of a transmission window, a location relationship between the transmission window and transmission time of a first physical frame, and the like that are described in this embodiment are the same as those in the prior art. Content of these parts has been described in the foregoing descriptions about the prior art, and details are not described herein again. Specifically, as shown in FIG. 2, an example in which the TW includes one access channel and one transmission channel is used for description in this embodiment, where the access channel includes three access timeslots with equal duration.

As described in this embodiment, the first node randomly selects, from the three access timeslots, one first access timeslot for sending access request information, namely, the first access timeslot described in this embodiment is any one of the three access timeslots. This is not specifically limited in this embodiment.

It should be noted that there may be one or more first nodes that send access request information to the second node, and therefore there may also be a plurality of first access timeslots in this embodiment. The plurality of first nodes can be classified into three types based on whether the first nodes have sent access request information to the second node.

1. A first-type first node is a first node that has not sent access request information to the second node. This type of first node can randomly select an access timeslot and send access request information to the second node in the selected access timeslot, only when full-duplex indication information indicates that a CRQ is empty.

2. A second-type first node is a first node that has sent access request information to the second node but the access request information is unsuccessfully received by the second node. This type of first node has joined a CRQ for queuing up, and waits for retransmitting the access request information to the second node until the first node is located at a queue start location of the CRQ.

3. A third-type first node is a first node that has sent access request information to the second node and the access request information is successfully received by the second node. This type of first node has joined a DTQ for queuing up, and waits for sending a second physical frame to the second node until the first node is located at a queue start location of the DTQ.

The first node sending access request information to the second node in step 402 can only belong to one of the second type and the third type. When the full-duplex indication information indicates that the CRQ is empty, the first node sending access request information to the second node in step 402 is the first-type first node. When the full-duplex indication information indicates that the CRQ is not empty, the first node sending access request information to the second node in step 402 is the second-type first node. Because the CRQ is empty or not empty, it is impossible that the first-type first node and the second-type first node send access request information to the second node at the same time.

Step 403: The second node receives the access request information that is sent by the first node in the first access timeslot.

It should be noted that the second node described in this embodiment also needs to determine a status of each first access timeslot. A method for detecting and determining the status of each access timeslot by the second node is the same as that in the prior art. Content of this part has been detailed in the foregoing descriptions about the prior art, and details are not described herein again.

Step 404: The second node sends full-duplex feedback information to the first node.

Same as the prior art, the full-duplex feedback information described in this embodiment is also carried in a fourth physical frame, and the full-duplex feedback information also indicates the status of each access timeslot on the access channel and a status of a first physical frame sent by the second node over the transmission channel.

In the prior art, when the second node sends the full-duplex feedback information, the first node does not receive the full-duplex feedback information sent by the second node, because a link between the second node and the first node is shielded, interference occurs, or the like. Consequently, the first node is uncertain about a status of the first access timeslot in which the first node sends the access request information, is uncertain about a subsequent processing action, and cannot continue performing full-duplex transmission. Different from the prior art, the second node described in this embodiment may further add the full-duplex feedback information to a first physical frame in a next transmission window, so that the first node can have an opportunity of receiving the full-duplex feedback information again.

Specifically, in this embodiment, a frame header of the first physical frame in the next transmission window carries the full-duplex feedback information, so that the second node can resend the full-duplex feedback information to the first node in the next transmission window.

Step 405: If the first node determines that the first access timeslot is in a successful state, the first node performs step 406.

Specifically, the first node described in this embodiment determines, based on the received full-duplex feedback information, the status of the first access timeslot in which the first node sends the access request information.

In the method described in this embodiment, an example in which the first node determines that the first access timeslot is in a successful state is used for description. If the status of the first access timeslot is an idle state, refer to an embodiment shown in FIG. 14. Details are not described herein. If the first node determines that the first access timeslot is in a conflicted state, the first node joins the conflict resolution queue CRQ for queuing up.

For a specific description of the conflict resolution queue CRQ, refer to the foregoing descriptions of the conflict resolution queue described in the prior art. Details are not described herein again.

Step 406: The first node obtains a target identifier.

The target identifier described in this embodiment is identification information of the first node, the first node having the target identifier sends the access request information in the first access timeslot, and the access request information is successfully received by the second node.

The following uses an example to describe a specific manner of obtaining the target identifier by the first node. It should be noted that a specific process of obtaining the target identifier by the first node is not limited in this embodiment.

A manner of obtaining the target identifier by the first node is as follows:

The second node described in this embodiment adds the target identifier to the fourth physical frame.

In this embodiment, after step 404 is performed, that is, after the second node sends the fourth physical frame to the first node, the first node can parse the fourth physical frame to obtain the target identifier carried in the fourth physical frame.

As shown in FIG. 2, the fourth physical frame is an ACK frame that is sent by the second node to the second node while the third node sends a third physical frame to the first node. The full-duplex feedback information is carried in the fourth physical frame. Therefore, in this embodiment, the full-duplex feedback information and the target identifier are sent together to the first node by carrying them in the fourth physical frame; or the target identifier used as a part of the full-duplex feedback information is sent to the first node by carrying the target identifier in the fourth physical frame.

Another manner of obtaining the target identifier by the first node is as follows:

The second node described in this embodiment adds the target identifier to the first physical frame sent in the next transmission window. After the second node sends the first physical frame in the next transmission window to the first node, the first node can parse the first physical frame to obtain the target identifier carried in the first physical frame.

It should be noted that herein the first physical frame is the first physical frame sent by the second node to the third node, and the first physical frame is sent by the second node to the third node in the next transmission window. A destination receiving node of a payload carried in the first physical frame is the third node, a destination receiving node of the full-duplex indication information carried in the frame header of the first physical frame is the first node, and the target identifier is also carried in the frame header of the first physical frame. The two information portions, namely, the payload and the frame header of the first physical frame, need to be received by the third node and the first node, respectively. However, because both the third node and the first node are within a coverage area of the second node, after the second node sends the first physical frame, the third node receives the first physical frame and parses the first physical frame to obtain payload information required by the third node, and the first node may parse the first physical frame to obtain the full-duplex indication information and the target identifier.

The next transmission window references a current transmission window. The current transmission window is the transmission window in which the first access timeslot used by the first node to send the access request information to the second node is located, and the next transmission window is a transmission window that appears following the current transmission window.

Step 407: The first node determines whether the target identifier is the same as an identifier of the first node, and if the target identifier is the same as the identifier of the first node, performs step 408; or if the target identifier is different from the identifier of the first node, performs step 409.

For better understanding of beneficial effects of the full-duplex transmission method described in this embodiment, a related solution in the prior art is first described by using an example.

If a plurality of first nodes send access request information to the second node in the first access timeslot, a plurality of first nodes that have requirements for sending a first physical frame to the second node are used as an example in this embodiment. In this embodiment, the plurality of first nodes, namely, a first target first node, a second target first node, and a third target first node, send the access request information to the second node in the first access timeslot. However, physical signals of the access request information that are sent by the plurality of first nodes in the first access timeslot may overlap completely in terms of time, and therefore the second node may successfully receive access request information with a highest signal-to-noise ratio. It is assumed that a signal-to-noise ratio of access request information sent by the third target first node is highest, and signal-to-noise ratios of access request information sent by the first target first node and the second target first node are lower than that of the access request information sent by the third target first node. In this case, the second node considers the access request information sent by the first target first node and the second target first node as noise and processes the access request information. In this way, the second node indicates, in the full-duplex feedback information, that the first access timeslot is in a successful state. Therefore, each first node sending the access request information in the first access timeslot considers that the first node joins the DTQ for queuing up. To be specific, the first target first node, the second target first node, and the third target first node all consider that they join the DTQ for queuing up.

However, actually, the second node successfully receives only the access request information sent by the third target first node, and consequently the second node considers that only the third target first node joins the DTQ for queuing up. When the third target first node is located at the queue start location of the DTQ, the second node indicates only an identifier of the third target first node in a "transmission device identifier" field in the full-duplex indication information. The first target first node and the second target first node determine that the first target first node and the second target first node have not joined the DTQ for queuing up but need to join the CRQ for queuing up, only when the first target first node and the second target first node receive the identifier of the third target first node carried in the full-duplex indication information, because both the first target first node and the second target first node determine that identifiers of the first target first node and the second target first node are different from the target identifier carried in the full-duplex indication information. However, the second node does not know that the first target first node and the second target first node send the access request information in the first access timeslot, and consequently in a CRQ length indicated by a "CRQ length" field in the full-duplex feedback information, the second node does not reserve queue locations for the first target first node and the second target first node in the CRQ. As a result, although the first target first node and the second target first node expect to join the CRQ to queue up for retransmitting the access request information, there are no queue locations for the first target first node and the second target first node in the CRQ, and then the first target first node and the second target first node cannot queue up in the CRQ.

In contrast, in this embodiment, before determining a queue location, the first node further needs to determine whether the target identifier is the same as the identifier of the first node, in combination with a case in which the first access timeslot indicated by the full-duplex feedback information is in a successful state. If the target identifier is different from the identifier of the first node, the first node can determine that the access request information that is sent by the first node in the first access timeslot is unsuccessfully received by the second node. If the target identifier is the same as the identifier of the first node, the first node can determine that the access request information that is sent by the first node in the first access timeslot is successfully received by the second node.

Step 408: The first node joins the DTQ for queuing up.

In the DTQ, if the queue location of the first node is located at the queue start location of the DTQ, the first node can send a second physical frame to the second node over the transmission channel.

It can be learned that in the method described in this embodiment, the first node joins the DTQ for queuing up, only when the first node determines that the first access timeslot indicated by the full-duplex feedback information is in a successful state, and that the target identifier is the same as the identifier of the first node.

Step 409: The first node determines a target queue location of the first node in the CRQ.

In this embodiment, when the target identifier is different from the identifier of the first node, the first node may determine the target queue location of the first node in the CRQ according to a first preset rule or a second preset rule. The target queue location is a queue location of the first node in the CRQ.

The following details the first preset rule described in this embodiment.

In this embodiment, when statuses of access timeslots indicated by the full-duplex feedback information are different, the first preset rule varies. The following describes the first preset rule based on the statuses of the access timeslots indicated by the full-duplex feedback information.

Figure 5:
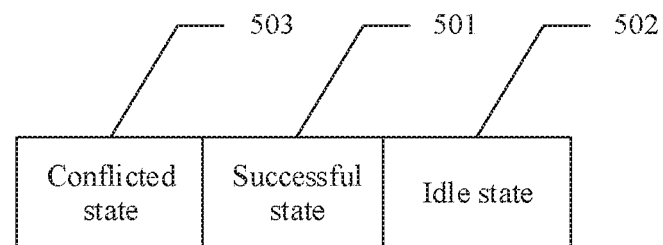
FIG. 5 is a schematic diagram of statuses of access timeslots on an access channel according to the present invention.

A first status of each access timeslot indicated by the full-duplex feedback information is as follows:

FIG. 5 is a schematic diagram of statuses of access timeslots on an access channel. The full-duplex feedback information indicates that the TW includes one second access timeslot in a conflicted state. Specifically, a second access timeslot 503, a first access timeslot 501, and a third access timeslot 502 are successively included in chronological order of the access timeslots. The full-duplex feedback information described in this embodiment indicates that the second access timeslot 503 is in a conflicted state, the first access timeslot 501 is in a successful state, and the third access timeslot 502 is in an idle state.

It can be learned from the foregoing that the first node described in this embodiment sends access request information to the second node in the first access timeslot 501. It can be learned from the foregoing that the second node indicates, in the full-duplex feedback information, that the first access timeslot 501 is in a successful state, and that the target identifier sent by the second node is different from the identifier of the first node. In this case, the first node determines that the access request information sent by the first node is unsuccessfully received by the second node. Then, the first node determines that the first node needs to join the CRQ for queuing up, and the location of the first node in the CRQ is the target queue location.

The following describes the target queue location:

When the first node determines, based on the full-duplex feedback information, that there is only one second access timeslot in a conflicted state, the first node determines that the target queue location is a queue location of the second access timeslot in the conflict resolution queue.

Figure 6:
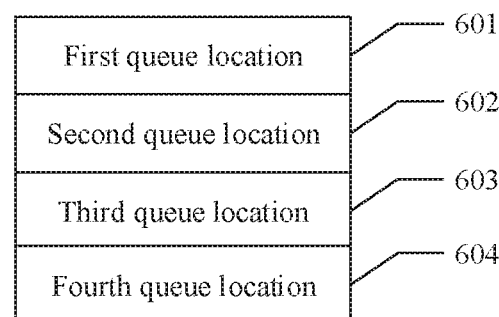
FIG. 6 is a schematic queuing diagram of a conflict resolution queue according to the present invention.

FIG. 6 is used as an example. The first node determines, based on the full-duplex feedback information, that existing queue locations in the CRQ are successively a first queue location 601, a second queue location 602, and a third queue location 603 in sequential order. A queue location, in the CRQ, of a first node sending access request information in the second access timeslot 503 is a newly added fourth queue location 604 in the CRQ. In this case, the first node determines that the target queue location is the fourth queue location 604.

Figure 7:
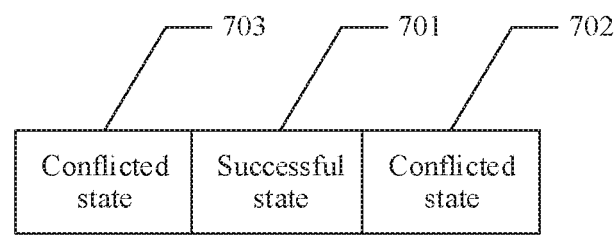
FIG. 7 is a schematic diagram of statuses of access timeslots on another access channel according to the present invention.

A second status of each access timeslot indicated by the full-duplex feedback information is as follows:

The full-duplex feedback information indicates that the TW includes two second access timeslots, where each of the second access timeslots is in a conflicted state. For details, refer to FIG. 7. FIG. 7 is a schematic structural diagram of an access channel in the TW. As shown in FIG. 7, an example in which the access channel in the TW includes three access timeslots is used for description in this embodiment.

A second access timeslot 703, a first access timeslot 701, and a second access timeslot 702 are successively included in chronological order of the access timeslots. The full-duplex feedback information described in this embodiment indicates that both the second access timeslot 703 and the second access timeslot 702 are in a conflicted state, and the first access timeslot 701 is in a successful state.

The following describes the target queue location:

When the first node determines, based on the full-duplex feedback information, that there are a plurality of second access timeslots in a conflicted state, the first node determines that the target queue location is a queue location, in the conflict resolution queue, of a second access timeslot in the plurality of second access timeslots that is closest to the first access timeslot.

Figure 8:
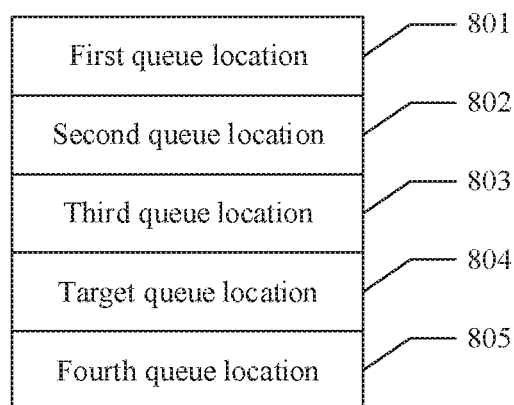
FIG. 8 is a schematic queuing diagram of another conflict resolution queue according to the present invention.

Using FIG. 8 as an example, existing queue locations in the CRQ are successively a first queue location 801, a second queue location 802, and a third queue location 803. The first node determines the target queue location based on the full-duplex feedback information. A second access timeslot in the two second access timeslots that is closest to the first access timeslot 701 is a target second access timeslot. The target queue location is a location, in the CRQ, of a first node sending access request information in the target second access timeslot.

In this manner, the first access timeslot 701 is located between the second access timeslot 703 and the second access timeslot 702, and a distance between the first access timeslot 701 and the second access timeslot 703 is equal to a distance between the first access timeslot 701 and the second access timeslot 702. Therefore, the target second access timeslot may be the second access timeslot 703, or the target second access timeslot may be the second access timeslot 702.

Optionally, the first node may determine that an earlier second access timeslot in the second access timeslot 702 and the second access timeslot 703 is the target second access timeslot. It can be learned that, as shown in FIG. 7, the target second access timeslot is the second access timeslot 703. In this case, a target queue location 804 described in this embodiment is the location, in the CRQ, of the first node sending the access request information in the second access timeslot 703. A fourth queue location 805 shown in FIG. 8 is a location, in the CRQ, of a first node sending access request information in the second access timeslot 702.

Figure 9:
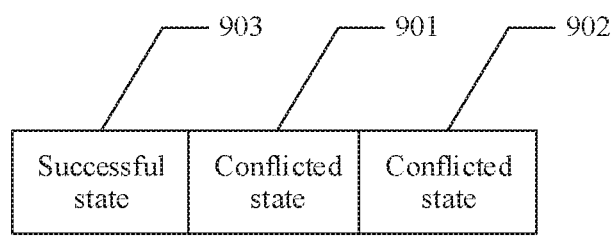
FIG. 9 is a schematic diagram of statuses of access timeslots on another access channel according to the present invention.

A third status of each access timeslot indicated by the full-duplex feedback information is as follows:

The full-duplex feedback information indicates that the TW includes two second access timeslots, where each of the second access timeslots is in a conflicted state. As shown in FIG. 9, an example in which an access channel in the TW includes three access timeslots is used for description in this embodiment.

A first access timeslot 903, a second access timeslot 901, and a second access timeslot 902 are successively included in chronological order of the access timeslots. The full-duplex feedback information described in this embodiment indicates that both the second access timeslot 901 and the second access timeslot 902 are in a conflicted state, and the first access timeslot 903 is in a successful state.

The following describes the target queue location:

Using FIG. 8 as an example, the existing queue locations in the CRQ are successively the first queue location 801, the second queue location 802, and the third queue location 803. The first node determines the target queue location based on the full-duplex feedback information. A second access timeslot in the two second access timeslots that is closest to the first access timeslot 903 is a target second access timeslot. The target queue location is a location, in the CRQ, of a first node sending access request information in the target second access timeslot.

In this manner, a distance between the second access timeslot 901 and the first access timeslot 903 is less than a distance between the second access timeslot 902 and the first access timeslot 903. Therefore, the target second access timeslot is the second access timeslot 901. In this case, the target queue location 804 described in this embodiment is the location, in the CRQ, of the first node sending the access request information in the second access timeslot 901. The fourth queue location 805 shown in FIG. 8 is a location, in the CRQ, of a first node sending access request information in the second access timeslot 902.

Figure 10:
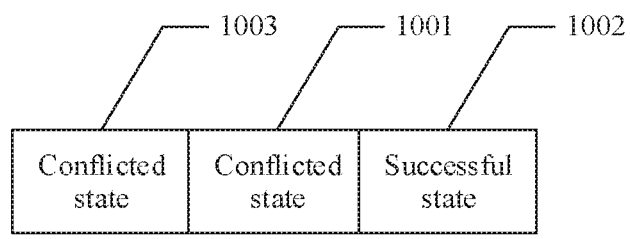
FIG. 10 is a schematic diagram of statuses of access timeslots on another access channel according to the present invention.

A fourth status of each access timeslot indicated by the full-duplex feedback information is as follows:

The full-duplex feedback information indicates that the TW includes two second access timeslots, where each of the second access timeslots is in a conflicted state. For details, refer to FIG. 10. FIG. 10 is a schematic structural diagram of an access channel in the TW As shown in FIG. 10, an example in which the access channel in the TV includes three access timeslots is used for description in this embodiment.

A second access timeslot 1003, a second access timeslot 1001, and a first access timeslot 1002 are successively included in chronological order of the access timeslots. The full-duplex feedback information described in this embodiment indicates that both the second access timeslot 1003 and the second access timeslot 1001 are in a conflicted state, and the first access timeslot 1002 is in a successful state.

Figure 11:
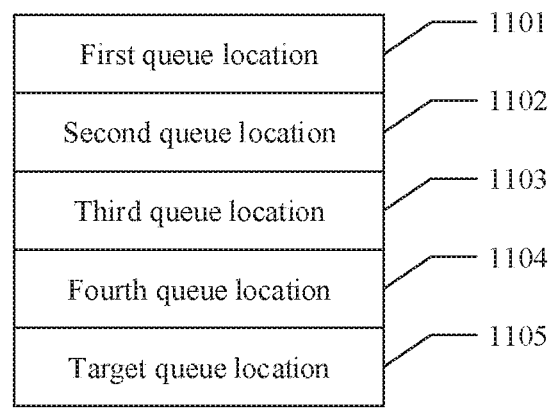
FIG. 11 is a schematic queuing diagram of another conflict resolution queue according to the present invention.

The following describes the target queue location:

Using FIG. 11 as an example, existing queue locations in the CRQ are successively a first queue location 1101, a second queue location 1102, and a third queue location 1103. The first node determines the target queue location based on the full-duplex feedback information. A second access timeslot in the two second access timeslots that is closest to the first access timeslot 1002 is a target second access timeslot. The target queue location is a location, in the CRQ, of a first node sending access request information in the target second access timeslot.

In this manner, a distance between the second access timeslot 1001 and the first access timeslot 1002 is less than a distance between the second access timeslot 1003 and the first access timeslot 1002. Therefore, as shown in FIG. 10, the target second access timeslot is the second access timeslot 1001. In this case, a target queue location 1105 described in this embodiment is the location, in the CRQ, of the first node sending the access request information in the second access timeslot 1001. A fourth queue location 1104 shown in FIG. 11 is a location, in the CRQ, of a first node sending access request information in the second access timeslot 1003.

Figure 12:
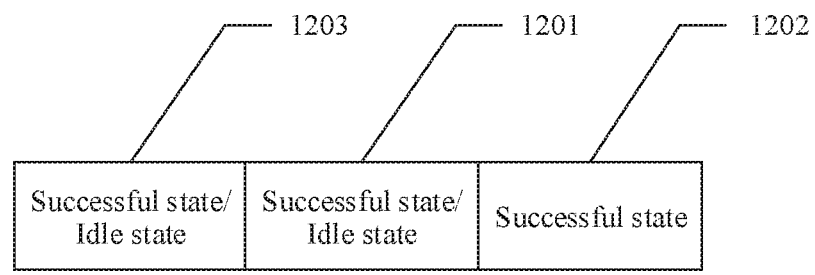
FIG. 12 is a schematic diagram of statuses of access timeslots on another access channel according to the present invention.

A fifth status of each access timeslot indicated by the full-duplex feedback information is as follows:

The full-duplex feedback information indicates that there is no timeslot in a conflicted state in access timeslots included in the TW. For details, refer to FIG. 12. FIG. 12 is a schematic structural diagram of an access channel in the TW. As shown in FIG. 12, an example in which the access channel in the TW includes three access timeslots is used for description in this embodiment.

A third access timeslot 1203, a fourth access timeslot 1201, and a first access timeslot 1202 are successively included in chronological order of the access timeslots. The full-duplex feedback information described in this embodiment indicates that both the third access timeslot 1203 and the fourth access timeslot 1201 are in a non-conflicted state. To be specific, the third access timeslot 1203 may be in a successful state or an idle state, the fourth access timeslot 1201 may be in a successful state or an idle state, and the first access timeslot 1202 is in a successful state.

Figure 13:
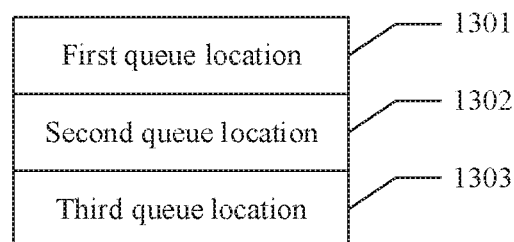
FIG. 13 is a schematic queuing diagram of another conflict resolution queue according to the present invention.

The following describes the target queue location:

As shown in FIG. 13, when the CRQ is not empty, that is, when existing queue locations in the CRQ are successively a first queue location 1301, a second queue location 1302, and a third queue location 1303, the first node determines the target queue location based on the full-duplex feedback information. The target queue location is a queue end location in the conflict resolution queue, that is, the target queue location is the third queue location 1303 located at the end of the queue.

In this embodiment, if the TW does not include an access timeslot whose status is a conflicted state, and the CRQ is empty, the first node does not join the CRQ for queuing up, and randomly selects an access timeslot in a second TW to send access request information. The second TW is a next TW of the TW.

The following details the second preset rule described in this embodiment.

In this embodiment, when statuses of access timeslots indicated by the full-duplex feedback information are different, the second preset rule varies. The following describes the second preset rule based on the statuses of the access timeslots indicated by the full-duplex feedback information.

A first status of each access timeslot indicated by the full-duplex feedback information is as follows:

If the full-duplex feedback information indicates that the TW includes at least one second access timeslot whose status is a conflicted state, the first node determines a target second access timeslot, where the target second access timeslot is any one of the at least one second access timeslot. In this case, the first node determines that the target queue location is a location, in the CRQ, of a first node sending access request information in the target second access timeslot.

It can be learned that in the second preset rule, the specific queue location of the first node in the CRQ is not indicated clearly. Instead, the first node selects one location from a plurality of locations, in the CRQ, of first nodes sending access request information in the any second access timeslot, as the target queue location.

A second status of each access timeslot indicated by the full-duplex feedback information is as follows:

If the full-duplex feedback information indicates that the TW does not include an access timeslot in a conflicted state, that is, any access timeslot included in the TW is in a successful state or an idle state, and the CRQ is not empty, the first node randomly selects one location from existing queue locations in the CRQ, as the queue location of the first node in the CRQ.

A third status of each access timeslot indicated by the full-duplex feedback information is as follows:

If the full-duplex feedback information indicates that the TW does not include an access timeslot in a conflicted state, that is, any access timeslot included in the TW is in a successful state or an idle state, and the CRQ is empty, the first node randomly selects one access timeslot in the second TW to send the access request information.

Beneficial effects described in this embodiment are as follows. If the second node indicates, in the full-duplex feedback information, that the first access timeslot is in a successful state, the second node needs to send the target identifier to indicate the identifier of the first node that successfully sends the access request information. If the first node determines that the target identifier is different from the identifier of the first node, the first node can determine that the second node unsuccessfully receives the access request information that is sent by the first node in the first access timeslot. The first node may determine the target queue location of the first node in the CRQ according to the first preset rule or the second preset rule. This effectively avoids a problem that a manner of performing a full-duplex transmission action after the first node fails in sending the access request information is uncertain. Therefore, in this embodiment, the first node can determine in a timely manner that the second node unsuccessfully receives, in the first access timeslot, the access request information sent by the first node. In this case, the first node does not join the DTQ for queuing up, and therefore time is not wasted. This reduces an access delay of the first node, determines a processing action of the first node after an error occurs in a DQ algorithm, and ensures correct running of the DQ algorithm after the error occurs, to ensure normal running of full-duplex transmission.

Figure 14:
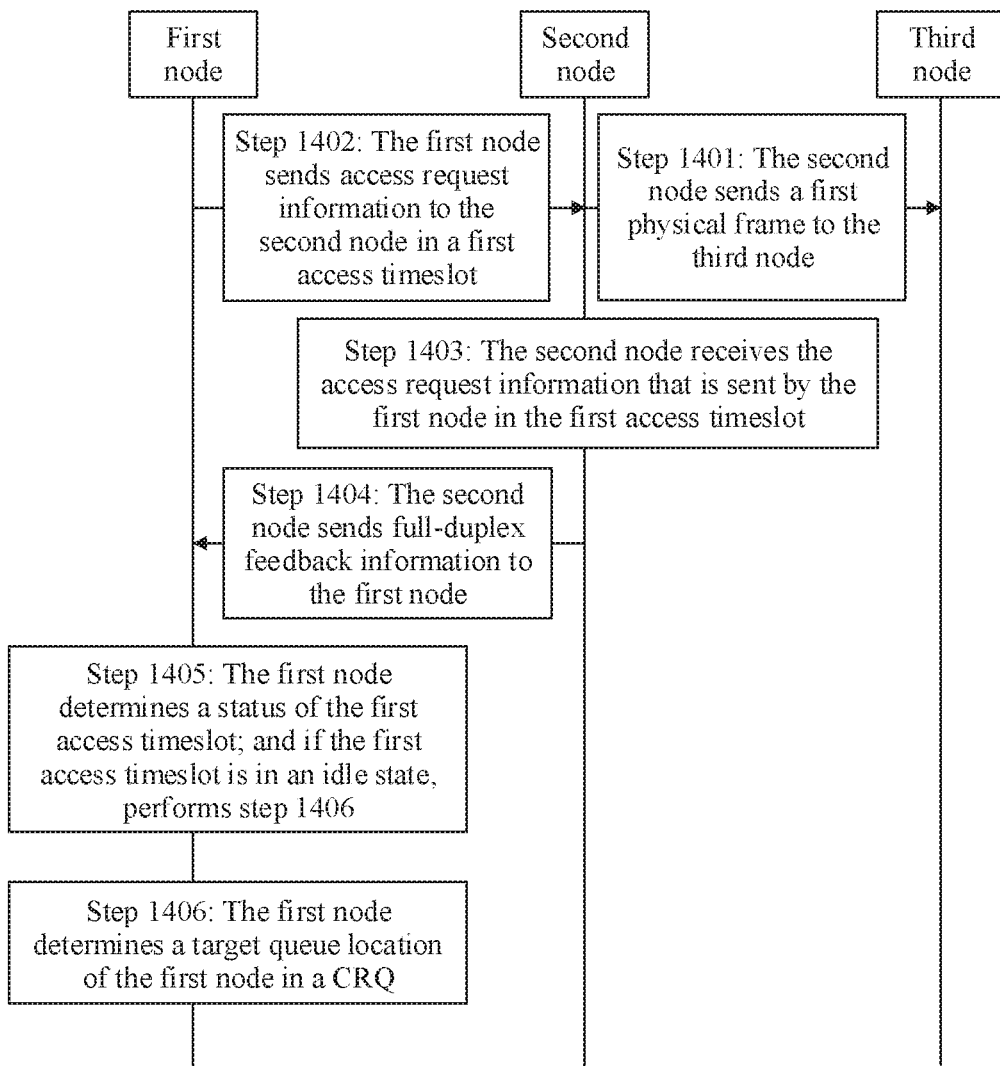
FIG. 14 is a step flowchart of an embodiment of a full-duplex transmission method according to the present invention.

With reference to FIG. 14, the following details another embodiment of a full-duplex transmission method provided in the present invention.

In the embodiment shown in FIG. 14, the status of the first access timeslot indicated by the full-duplex feedback information is different from that described in the embodiment shown in FIG. 4. The first access timeslot is in a successful state in the embodiment shown in FIG. 4, while the first access timeslot is in an idle state in the embodiment shown in FIG. 14.

Step 1401: A second node sends a first physical frame to a third node.

Step 1402: A first node sends access request information to the second node in a first access timeslot.

Step 1403: The second node receives the access request information that is sent by the first node in the first access timeslot.

Step 1404: The second node sends full-duplex feedback information to the first node.

For a specific execution process of step 1401 to step 1404 described in this embodiment, refer to step 401 to step 404 described in the embodiment in FIG. 4. Details are not described in this embodiment again.

Step 1405: The first node determines a status of the first access timeslot; and if the first access timeslot is in an idle state, performs step 1406.

For better understanding of the method described in this embodiment of the present invention, a disadvantage of the prior art is first described by using an example.

On a visible light communications network, if the first node selects a first access timeslot in a TW, the first node may send access request information in the first access timeslot, and another first node may also send access request information in the first access timeslot. For example, a plurality of first nodes that send access request information in the first access timeslot are specifically a first target first node, a second target first node, and a third target first node. To be specific, the first target first node, the second target first node, and the third target first node all send the access request information to the second node in the first access timeslot.

If a link between the second node and each of the first target first node, the second target first node, and the third target first node is shielded, interference occurs, or the like, the second node does not detect the access request information that is sent by the first target first node, the second target first node, and the third target first node in the first access timeslot, and then the second node indicates, in the full-duplex feedback information, that the status of the first access timeslot is an idle state. In this case, the first target first node should have joined a CRQ for queuing up, but the second node considers that no first node sends access request information in the first access timeslot, and consequently in a CRQ length indicated by a "CRQ length" field in the full-duplex feedback information, the second node does not reserve queue locations for the first target first node, the second target first node, and the third target first node in the CRQ. As a result, after the first target first node enters an indefinite state, the first target first node is uncertain about a subsequent processing action, affecting normal implementation of the full-duplex transmission method.

Step 1406: The first node determines a target queue location of the first node in the CRQ.

For a specific execution process of step 1406 described in this embodiment, refer to step 409 shown in FIG. 4. The specific execution process is not described in this embodiment.

Beneficial effects of using the method described in this embodiment are as follows. If the second node indicates, in the full-duplex feedback information, that the status of the first access timeslot is an idle state, to avoid that the first node cannot successfully send the access request information to the second node because the link between the first node and the second node is shielded, interference occurs, or the like, when the first node determines that the first access timeslot is in an idle state, the first node determines a specific queue location of the first node in the CRQ directly based on the full-duplex feedback information. This effectively ensures normal running of full-duplex transmission.

Figure 15A:
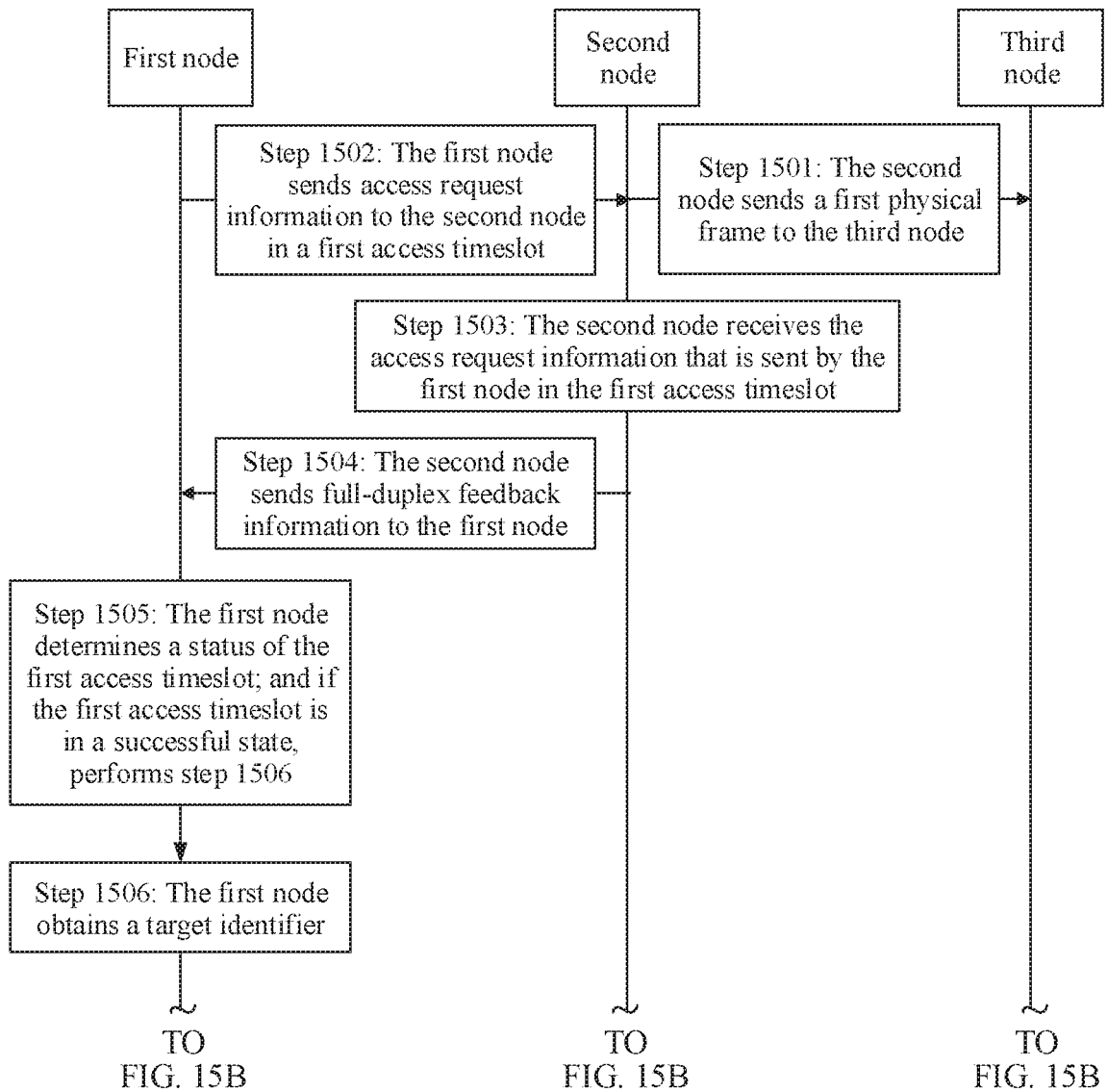
FIG. 15A and FIG. 15B are a step flowchart of an embodiment of a full-duplex transmission method according to the present invention.
Figure 15B:
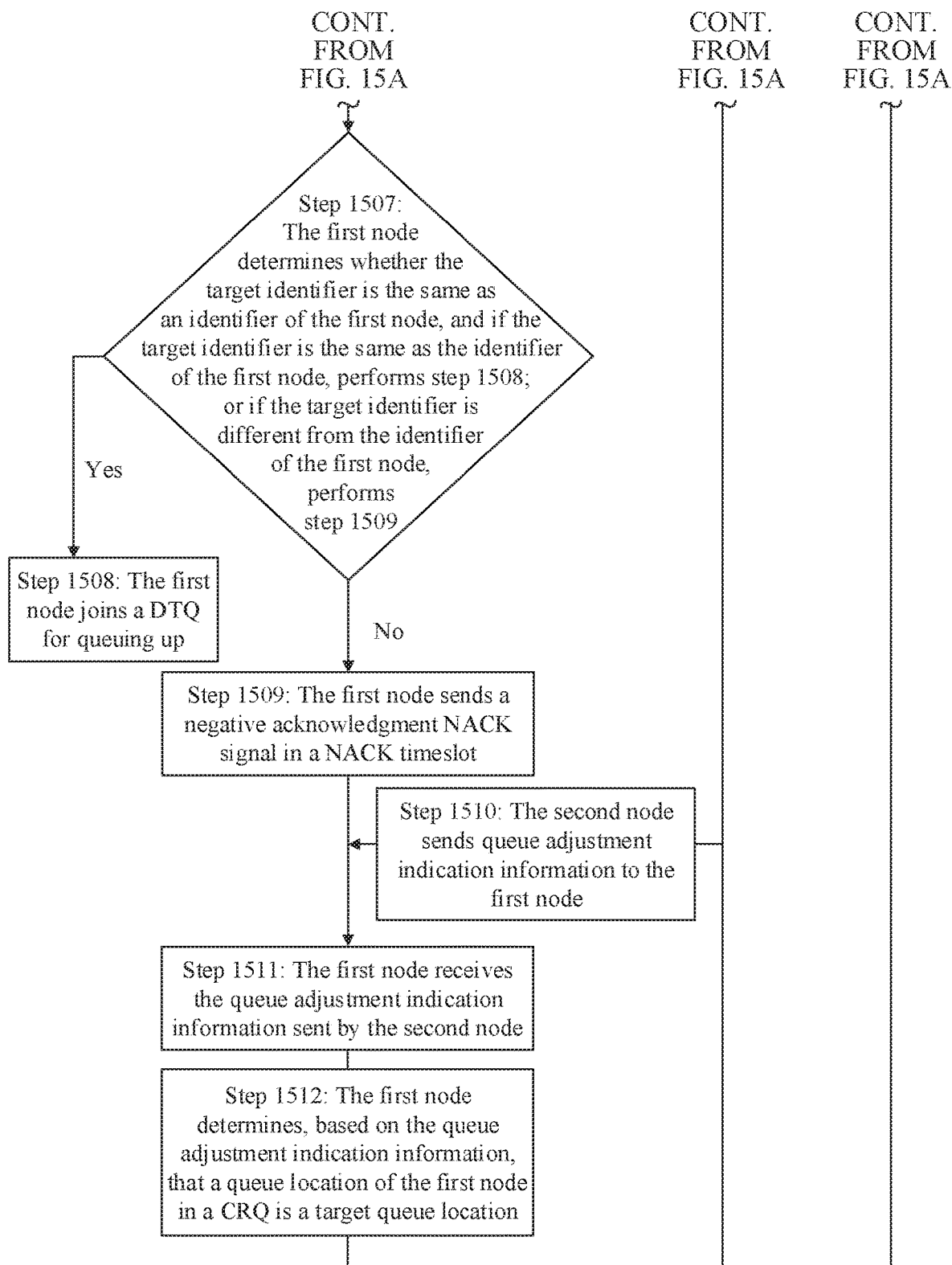

In both the embodiment shown in FIG. 4 and the embodiment shown in FIG. 14, the first node determines the target queue location based on the information sent by the second node. With reference to FIG. 15A and FIG. 15B, the following describes a process in which the second node provides an indication and cooperates with the first node in participating in determining the target queue location.

Step 1501: The second node sends a first physical frame to a third node.

Step 1502: The first node sends access request information to the second node in a first access timeslot.

Step 1503: The second node receives the access request information that is sent by the first node in the first access timeslot.

Step 1504: The second node sends full-duplex feedback information to the first node.

Step 1505: The first node determines a status of the first access timeslot; and if the status of the first access timeslot is a successful state, performs step 1506.

Step 1506: The first node obtains a target identifier.

Step 1507: The first node determines whether the target identifier is the same as an identifier of the first node, and if the target identifier is the same as the identifier of the first node, performs step 1508; or if the target identifier is different from the identifier of the first node, performs step 1509.

Step 1508: The first node joins a DTQ for queuing up.

For a specific execution process of step 1501 to step 1508 described in this embodiment, refer to step 401 to step 408 shown in FIG. 4. Details are not described again.

Step 1509: The first node sends a negative acknowledgment NACK signal in a NACK timeslot.

Figure 16:
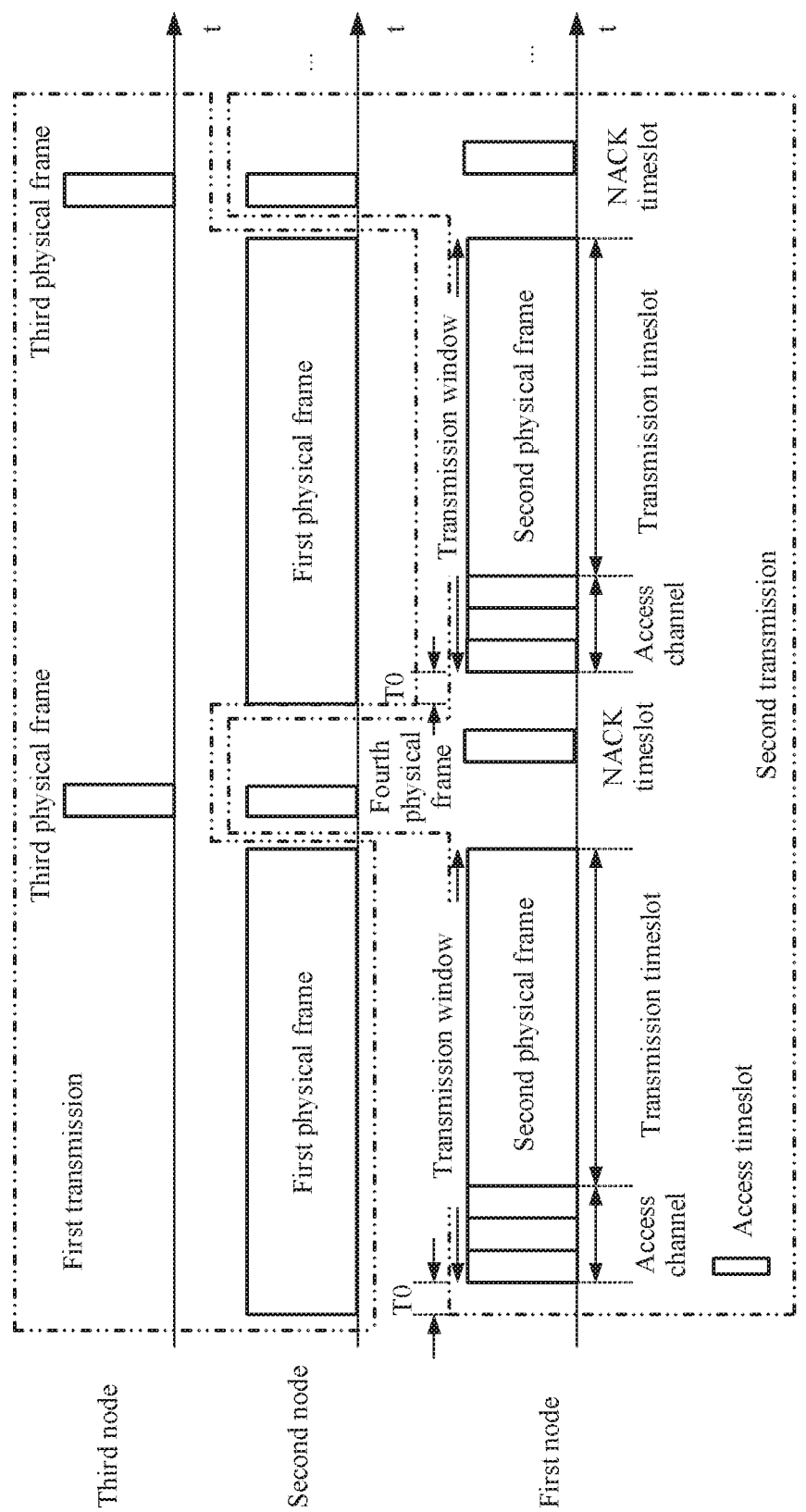
FIG. 16 is a schematic diagram of an embodiment of full-duplex transmission according to the present invention.

As shown in FIG. 16, the negative acknowledgment NACK timeslot described in this embodiment appears after the second node has sent the full-duplex feedback information. For a specific description of sending the full-duplex feedback information by the second node to the first node, refer to the embodiment shown in FIG. 9. This is not specifically limited.

Step 1510: The second node sends queue adjustment indication information to the first node.

There are two manners of sending the queue adjustment indication information by the second node to the first node:

One manner is: The second node described in this embodiment detects whether there is the NACK signal in the NACK timeslot; and if the second node detects that there is the NACK signal, the second node sends the queue adjustment indication information to the first node. Specifically, the second node adds the queue adjustment indication information to a first physical frame that is sent by the second node in a next transmission window. The queue adjustment indication information is used to indicate the target queue location, and the target queue location is any location in a CRQ. A specific location of the target queue location in the CRQ is not limited in this embodiment. For example, the target queue location may be a queue end location in the CRQ.

The other manner is: The second node described in this embodiment may add the queue adjustment indication information to a first physical frame, in each transmission window, sent by the second node to the first node. In this case, the queue adjustment indication information needs to indicate whether a CRQ length is adjusted. The queue adjustment indication information sent by the second node can indicate that the CRQ length is adjusted, and the queue adjustment indication information indicates the target queue location, only when the second node detects that there is the NACK signal.

Optionally, the queue adjustment indication information may further be used to indicate addition of 1 to the CRQ length, and one queue location is newly added to the end of the queue to serve as the target queue location.

If the queue adjustment indication information is used to indicate addition of 1 to the CRQ length, one queue location is newly added to the end of the queue to serve as the target queue location. This can avoid that the first node queues up in existing queue locations in the CRQ, reduce a quantity of first nodes that queue up in the existing queue locations, and avoid increasing a conflict resolution time for the existing queue locations.

Step 1511: The first node receives the queue adjustment indication information sent by the second node.

Step 1512: The first node determines, based on the queue adjustment indication information, that a queue location of the first node in the CRQ is the target queue location.

Beneficial effects of using the method described in this embodiment are as follows. If the second node indicates, in the full-duplex feedback information, that the status of the first access timeslot is a successful state, the second node needs to send the target identifier. The access request information is sent in the first access timeslot but the target identifier indicated by the second node does not match the identifier of the first node. In this case, the first node can determine that the access request information that is sent by the first node in the first access timeslot is unsuccessfully received by the second node, and then the first node can send the NACK signal in the NACK timeslot. If the second node detects that there is the NACK signal in the NACK timeslot, the second node can determine that the second node unsuccessfully receives the access request information sent by the first node, and then the second node can send the queue adjustment indication information to the first node, to indicate the target queue location. All first nodes sending NACK signals queue up at the target queue location. In this way, the first node described in this embodiment can determine in a timely manner a case in which the access request information sent by the first node is unsuccessfully received by the second node, and may further notify the second node of the case, so that the second node can determine in a timely manner the case in which the access request information sent by the first node is unsuccessfully received by the second node. Then, the second node can adjust the CRQ length, and add a queue location to the end of the CRQ for the first node. This avoids that time is wasted because the first node mistakenly considers that the first node has joined the DTQ for queuing up, reduces an access delay of the first node, determines a processing action of the first node after an error occurs in a DQ algorithm, and ensures correct running of the DQ algorithm after the error occurs.

Figure 17:
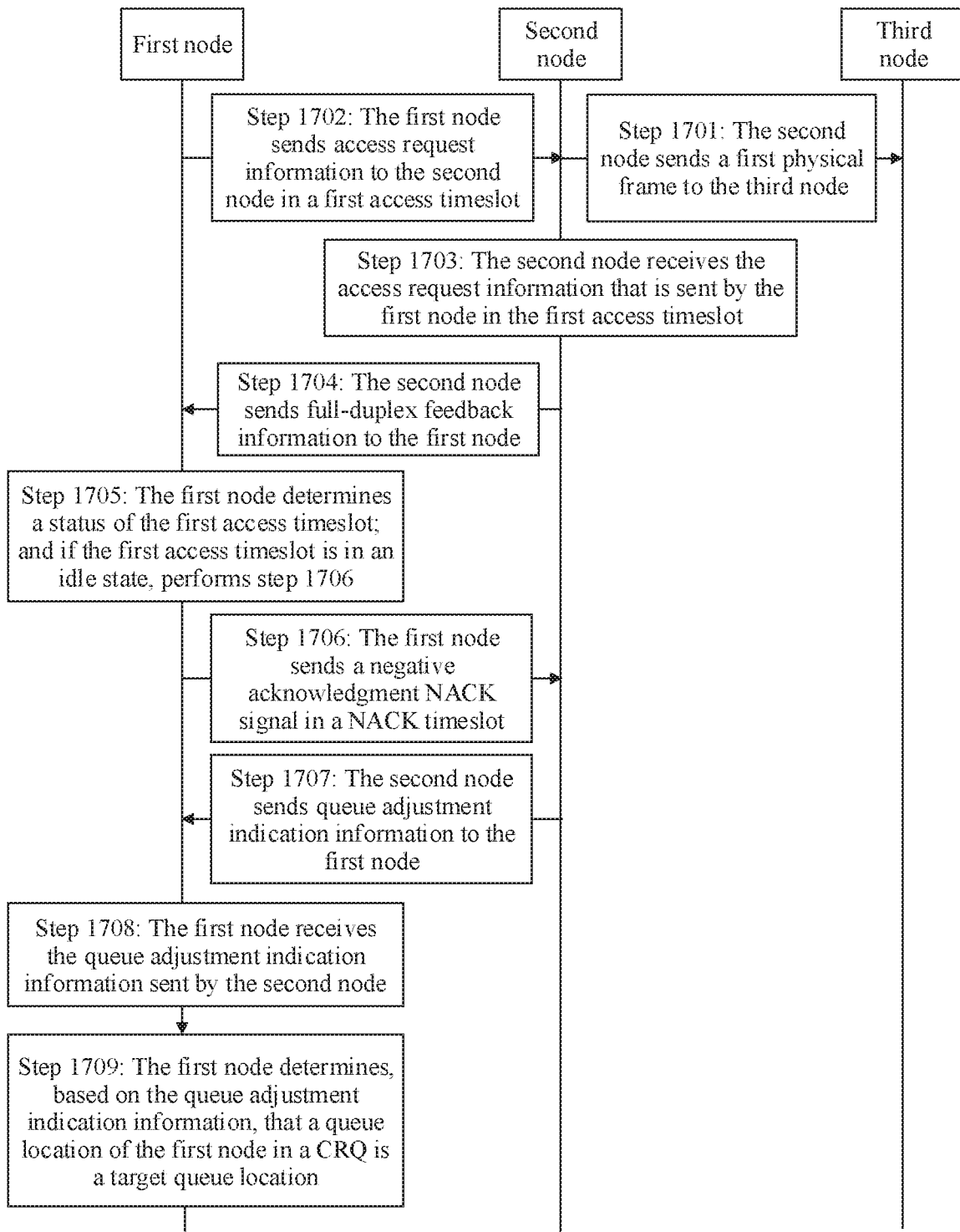
FIG. 17 is a step flowchart of an embodiment of a full-duplex transmission method according to the present invention.

With reference to FIG. 17, the following details another embodiment of a full-duplex transmission method provided in the present invention.

In the embodiment shown in FIG. 17, the status of the first access timeslot indicated by the full-duplex feedback information is different from that described in the embodiment shown in FIG. 15A and FIG. 15B. The status of the first access timeslot is a successful state in the embodiment shown in FIG. 15A and FIG. 15B, while the status of the first access timeslot is an idle state in the embodiment shown in FIG. 17.

Step 1701: A second node sends a first physical frame to a third node.

Step 1702: A first node sends access request information to the second node in a first access timeslot.

Step 1703: The second node receives the access request information that is sent by the first node in the first access timeslot.

Step 1704: The second node sends full-duplex feedback information to the first node.

Step 1705: The first node determines a status of the first access timeslot; and if the status of the first access timeslot is an idle state, performs step 1706.

Step 1706: The first node sends a negative acknowledgment NACK signal in a NACK timeslot.

Step 1707: The second node sends queue adjustment indication information to the first node.

Step 1708: The first node receives the queue adjustment indication information sent by the second node.

Step 1709: The first node determines, based on the queue adjustment indication information, that a queue location of the first node in a CRQ is the target queue location.

For a specific execution process of step 1706 to step 1709 described in this embodiment, refer to the specific execution process of step 1509 to step 1512 shown in FIG. 15A and FIG. 15B. Details are not described again.

Beneficial effects of using the method described in this embodiment are as follows. If the second node indicates, in the full-duplex feedback information, that the status of the first access timeslot is an idle state, to avoid that the first node cannot successfully send the access request information to the second node because a link between the first node and the second node is shielded, interference occurs, or the like, when the first node determines that the first access timeslot is in an idle state, the first node can send the NACK signal in the NACK timeslot. If the second node detects that there is the NACK signal in the NACK timeslot, the second node can determine that the second node unsuccessfully receives the access request information sent by the first node, and then the second node can send the queue adjustment indication information to the first node, to indicate the target queue location. All first nodes sending NACK signals queue up at the target queue location. In this way, the first node described in this embodiment can determine in a timely manner a case in which the access request information sent by the first node is unsuccessfully received by the second node, and may further notify the second node of the case, so that the second node can determine in a timely manner the case in which the access request information sent by the first node is unsuccessfully received by the second node. This avoids that time is wasted because the first node mistakenly considers that the first node has joined a DTQ for queuing up, reduces an access delay of the first node, determines a processing action of the first node after an error occurs in a DQ algorithm, and ensures correct running of the DQ algorithm after the error occurs.

Figure 18:
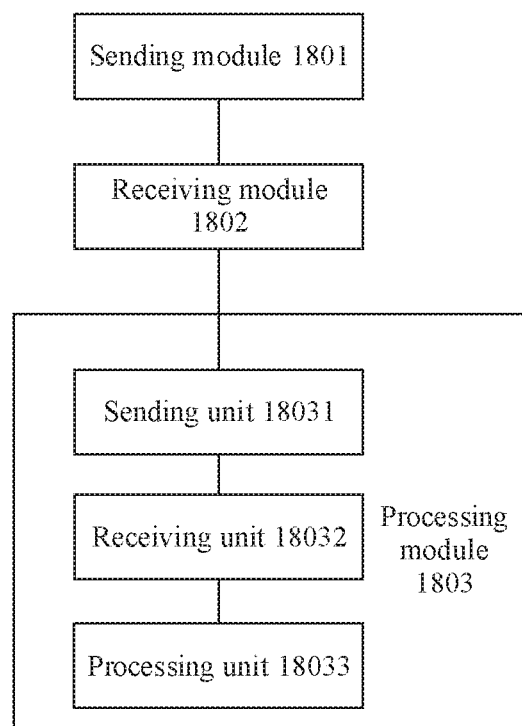
FIG. 18 is a schematic structural diagram of an embodiment of a first node according to the present invention.

The following describes, with reference to FIG. 18 by using an example from a perspective of a functional module, a specific structure of a first node provided in an embodiment of the present invention.

The first node includes:

a sending module 1801, configured to send access request information to a second node in a first access timeslot;

a receiving module 1802, configured to receive full-duplex feedback information sent by the second node; where the receiving module 1802 is further configured to receive a target identifier sent by the second node, when the full-duplex feedback information indicates that the first access timeslot is in a successful state; and a processing module 1803, configured to: when the first node determines that the target identifier is different from an identifier of the first node, or when the full-duplex feedback information indicates that the first access timeslot is in an idle state, determine a target queue location of the first node in the conflict resolution queue.

Optionally, the processing module 1803 is further configured to: if the full-duplex feedback information indicates that there is only one second access timeslot in a conflicted state, determine that the target queue location is a queue location of the second access timeslot in the conflict resolution queue.

Optionally, the processing module 1803 is further configured to: if the full-duplex feedback information indicates that there are a plurality of second access timeslots in a conflicted state, determine that the target queue location is a queue location, in the conflict resolution queue, of a second access timeslot in the plurality of second access timeslots that is closest to the first access timeslot.

Optionally, the processing module 1803 is further configured to: if the full-duplex feedback information indicates that there are a plurality of second access timeslots in a conflicted state, and two second access timeslots in the plurality of second access timeslots are closest to the first access timeslot, determine that the target queue location is a queue location, in the conflict resolution queue, of a second access timeslot in a higher rank in the two second access timeslots that are closest to the first access timeslot.

Optionally, the processing module 1803 is further configured to: if the full-duplex feedback information indicates that all access timeslots are in a successful state or an idle state, when the conflict resolution queue is not empty, determine that the target queue location is a queue end location in the conflict resolution queue.

Optionally, the processing module 1803 includes:

a sending unit 18031, configured to send a NACK signal in a negative acknowledgment NACK timeslot, where the negative acknowledgment NACK timeslot appears after the receiving module receives the full-duplex feedback information;

a receiving unit 18032, configured to receive queue adjustment indication information sent by the second node, where the queue adjustment indication information is used to indicate the target queue location, and the target queue location is any location in the conflict resolution queue or a location following a queue end location in the conflict resolution queue; and a processing unit 18033, configured to determine the target queue location based on the queue adjustment indication information.

Optionally, the processing module 1803 is further configured to: if the full-duplex feedback information indicates that there are a plurality of second access timeslots in a conflicted state, determine that the target queue location is a queue location, in the conflict resolution queue, of any one of the plurality of second access timeslots.

Optionally, if the full-duplex feedback information indicates that all access timeslots are in a successful state or an idle state, the processing module 1803 is further configured to: when the conflict resolution queue is not empty, determine that the target queue location is any location in the conflict resolution queue.

Optionally, the receiving module 1802 is further configured to obtain a physical frame sent by the second node, where the target identifier is carried in the physical frame, and the physical frame is sent by the second node after the second node has sent the full-duplex feedback information; or the receiving module 1802 is further configured to obtain the target identifier carried in the received full-duplex feedback information.

Optionally, the processing module 1803 is further configured to: if the processing module 1803 determines that the target identifier is the same as the identifier of the first node, determine that the first node joins a data transmission queue for queuing up.

The first node described in this embodiment is configured to perform the methods in the embodiments shown in FIG. 4 and FIG. 14. For a specific execution process, refer to FIG. 4 and FIG. 14. Details are not described again.

Figure 19:
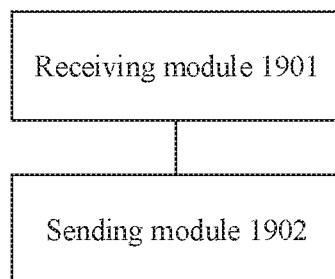
FIG. 19 is a schematic structural diagram of an embodiment of a second node according to the present invention.

The following describes, with reference to FIG. 19 by using an example from a perspective of a functional module, a specific structure of a second node provided in an embodiment of the present invention. The second node includes:

a receiving module 1901, configured to receive, in a first access timeslot, access request information sent by a first node; and a sending module 1902, configured to send full-duplex feedback information to the first node.

The sending module 1902 is further configured to send a target identifier to the first node when the full-duplex feedback information indicates that the first access timeslot is in a successful state.

Optionally, the sending module 1902 is further configured to send a physical frame to the first node, where the target identifier is carried in the physical frame, and the physical frame is sent by the sending module after the sending module has sent the full-duplex feedback information.

Optionally, the sending module 1902 is configured to send, to the first node, the full-duplex feedback information carrying the target identifier.

The first node described in this embodiment is configured to perform the method in the embodiment in FIG. 4. For a specific execution process, refer to FIG. 4. Details are not described again.

Figure 20:
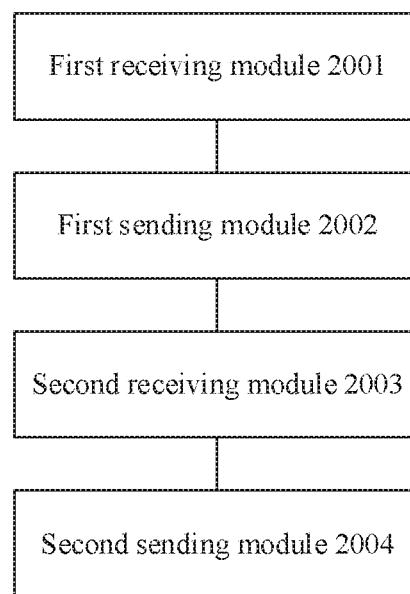
FIG. 20 is a schematic structural diagram of another embodiment of a second node according to the present invention.

The following describes, with reference to FIG. 20 by using an example from a perspective of a functional module, a specific structure of a second node provided in an embodiment of the present invention. The second node includes:

a first receiving module 2001, configured to receive, in a first access timeslot, access request information sent by a first node;

a first sending module 2002, configured to send full-duplex feedback information to the first node;

a second receiving module 2003, configured to: when the full-duplex feedback information indicates that the first access timeslot is in a successful state, and the first node determines that a target identifier sent by the second node is different from an identifier of the first node, or when the full-duplex feedback information indicates that the first access timeslot is in an idle state, receive, in a negative acknowledgment NACK timeslot, a NACK signal sent by the first node, where the negative acknowledgment NACK timeslot appears after the first node receives the full-duplex feedback information; and a second sending module 2004, configured to: if the second receiving module 2003 detects that there is the NACK signal in the NACK timeslot, send queue adjustment indication information to the first node, where the queue adjustment indication information is used to indicate a target queue location, and the target queue location is any location in a conflict resolution queue or a location following a queue end location in the conflict resolution queue.

The second node described in this embodiment is configured to perform the method in the embodiment in FIG. 15A and FIG. 15B. For a specific execution process, refer to FIG. 15A and FIG. 15B. Details are not described again.

In another possible design, when the apparatus is a chip in a terminal, the chip includes a processing unit and a communications unit. The processing unit may be, for example, a processor. The communications unit may be, for example, an input/output interface, a pin, or a circuit. The processing unit may execute a computer-executable instruction stored in a storage unit, so that the chip in a terminal performs the method in any one of the implementations. Optionally, the storage unit is a storage unit in the chip, for example, a register or a buffer, or the storage unit may be a storage unit in the terminal but outside the chip, for example, a read-only memory (ROM), another type of static storage device that can store static information and instructions, or a random access memory (RAM).

The processor mentioned in any of the foregoing designs may be a general-purpose central processing unit (CPU), a microprocessor, an application-specific integrated circuit (ASIC), or one or more integrated circuits configured to control program execution of the wireless communication method according to the first aspect.

It may be clearly understood by a person skilled in the art that for convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in a form of a software product. The computer software product is stored in a storage medium and includes instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A full-duplex transmission method, comprising:
    sending, by a first node, access request information to a second node in a first access timeslot;
    receiving, by the first node, full-duplex feedback information sent by the second node;
    receiving, by the first node, a target identifier sent by the second node, when the full-duplex feedback information indicating that the first access timeslot is in a successful state; and
    determining, by the first node, a target queue location of the first node associated with a conflict resolution queue in response to at least one of:
        determining that the target identifier is different from an identifier of the first node, or
        determining that the full-duplex feedback information indicates that the first access timeslot is in an idle state.

2. The full-duplex transmission method according to claim 1, wherein determining, by the first node, a target queue location of the first node associated with a conflict resolution queue comprises:
    in response to determining that the full-duplex feedback information indicates that there is only one second access timeslot in a conflicted state, determining, by the first node, that the target queue location is a queue location of the second access timeslot in the conflict resolution queue.

3. The full-duplex transmission method according to claim 1, wherein determining, by the first node, a target queue location of the first node associated with a conflict resolution queue comprises:
    in response to determining that the full-duplex feedback information indicates that there are a plurality of second access timeslots in a conflicted state, determining, by the first node, that the target queue location is a queue location, in the conflict resolution queue, of a second access timeslot in the plurality of second access timeslots that is closest to the first access timeslot.

4. The full-duplex transmission method according to claim 1, wherein determining, by the first node, a target queue location of the first node associated with a conflict resolution queue comprises:
    in response to determining that the full-duplex feedback information indicates that there are a plurality of second access timeslots in a conflicted state and two second access timeslots in the plurality of second access timeslots are closest to the first access timeslot, determining, by the first node, that the target queue location is a queue location, in the conflict resolution queue, of a second access timeslot in a higher rank in the two second access timeslots that are closest to the first access timeslot.

5. The full-duplex transmission method according to claim 1, wherein determining, by the first node, a target queue location of the first node associated with a conflict resolution queue comprises:
    in response to determining that the full-duplex feedback information indicates that all access timeslots are in the successful state or idle state and that the conflict resolution queue is not empty, determining, by the first node, that the target queue location is a queue end location in the conflict resolution queue.

6. The full-duplex transmission method according to claim 1, further comprising:
    sending, by the first node, a negative acknowledgment (NACK) signal in a NACK timeslot, wherein the NACK timeslot appears after the first node receives the full-duplex feedback information;
    receiving, by the first node, queue adjustment indication information sent by the second node, wherein the queue adjustment indication information indicates the target queue location of the first node to be one of any location in the conflict resolution queue and a location following a queue end location in the conflict resolution queue; and
    determining, by the first node, the target queue location based on the queue adjustment indication information.

7. A full-duplex transmission method, comprising:
    receiving, by a second node in a first access timeslot, access request information sent by a first node;
    sending, by the second node, full-duplex feedback information to the first node;
    sending, by the second node, a target identifier to the first node in response to determining that the full-duplex feedback information indicates that the first access timeslot is in a successful state;
    receiving, by the second node in a negative acknowledgment (NACK) timeslot, a NACK signal sent by the first node, wherein the NACK timeslot appears after the first node receives the full-duplex feedback information; and
    in response to detecting that there is the NACK signal in the NACK timeslot, sending, by the second node, queue adjustment indication information to the first node, wherein the queue adjustment indication information indicates a target queue location of the first node to be one of any location in a conflict resolution queue and a location following a queue end location in the conflict resolution queue.

8. The full-duplex transmission method according to claim 7, wherein sending, by the second node, a target identifier to the first node comprises:
    sending, by the second node, a physical frame to the first node, wherein the target identifier is carried in the physical frame, and the physical frame is sent by the second node after the second node has sent the full-duplex feedback information.

9. The full-duplex transmission method according to claim 7, wherein sending, by the second node, a target identifier to the first node comprises:

sending, by the second node to the first node, the full-duplex feedback information carrying the target identifier.

10. A first node, comprising:
a transmitter configured to send access request information to a second node in a first access timeslot;
a receiver configured to receive (1) full-duplex feedback information sent by the second node and (2) a target identifier sent by the second node, the full-duplex feedback information indicating that the first access timeslot is in a successful state;
at least one processor; and
a non-transitory computer-readable storage medium coupled to the at least one processor and storing programming instructions for execution by the at least one processor, wherein the programming instructions instruct the at least one processor to perform operations comprising:
determining a target queue location of the first node associated with a conflict resolution queue in response to one of:
determining that the target identifier is different from an identifier of the first node, or
determining that the full-duplex feedback information indicates that the first access timeslot is in an idle state.

11. The first node according to claim 10, wherein the programming instructions instruct the at least one processor to perform operations further comprising:
in response to determining that the full-duplex feedback information indicates that there is only one second access timeslot in a conflicted state, determining that the target queue location is a queue location of the second access timeslot in the conflict resolution queue.

12. The first node according to claim 10, wherein the programming instructions instruct the at least one processor to perform operations further comprising:
in response to determining that the full-duplex feedback information indicates that there are a plurality of second access timeslots in a conflicted state, determining that the target queue location is a queue location, in the conflict resolution queue, of a second access timeslot in the plurality of second access timeslots that is closest to the first access timeslot.

13. The first node according to claim 10, wherein programming instructions instruct the at least one processor to perform operations further comprising:
in response to determining that the full-duplex feedback information indicates that there are a plurality of second access timeslots in a conflicted state and two second access timeslots in the plurality of second access timeslots are closest to the first access timeslot, determining that the target queue location is a queue location, in the conflict resolution queue, of a second access timeslot in a higher rank in the two second access timeslots that are closest to the first access timeslot.

14. The first node according to claim 10, wherein programming instructions instruct the at least one processor to perform operations further comprising:
in response to determining that the full-duplex feedback information indicates that all access timeslots are in the successful state or idle state and that the conflict resolution queue is not empty, determining that the target queue location is a queue end location in the conflict resolution queue.

15. The first node according to claim 10, wherein the programming instructions instruct the at least one processor to perform operations further comprising:
sending a negative acknowledgment (NACK) signal in a NACK timeslot, wherein the NACK timeslot appears after the receiver receives the full-duplex feedback information,
receiving queue adjustment indication information sent by the second node, wherein the queue adjustment indication information indicates the target queue location to be one of any location in the conflict resolution queue and a location following a queue end location of the conflict resolution queue; and
determining the target queue location based on the queue adjustment indication information.

16. A second node, comprising:
a receiver configured to receive, in a first access timeslot, access request information sent by a first node; and
a transmitter configured to:
send full-duplex feedback information to the first node, and
send a target identifier to the first node if the full-duplex feedback information indicates that the first access timeslot is in a successful state,
wherein the receiver is configured to receive, in a negative acknowledgment (NACK) timeslot, a NACK signal sent by the first node, wherein the NACK timeslot appears after the first node receives the full-duplex feedback information, and
wherein the transmitter is configured to:
if there is the NACK signal in the NACK timeslot, send queue adjustment indication information to the first node, wherein the queue adjustment indication information indicates a target queue location of the first node to be one of any location in a conflict resolution queue and a location following a queue end location in a conflict resolution queue.

17. The second node according to claim 16, wherein the transmitter is configured to send a physical frame to the first node, and
wherein the target identifier is carried in the physical frame, and the physical frame is sent by the transmitter after the transmitter has sent the full-duplex feedback information.

18. The second node according to claim 16, wherein the transmitter is configured to send, to the first node, the full-duplex feedback information carrying the target identifier.

* * * * *